United States Patent
Numakura et al.

(10) Patent No.: US 7,768,978 B2
(45) Date of Patent: Aug. 3, 2010

(54) WIRELESS COMMUNICATION METHOD AND MOBILE TERMINAL USED THEREFOR

(75) Inventors: Keiko Numakura, Tokyo (JP); Akira Otsuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/493,306

(22) PCT Filed: Nov. 8, 2001

(86) PCT No.: PCT/JP01/09787

§ 371 (c)(1),
(2), (4) Date: May 3, 2004

(87) PCT Pub. No.: WO03/041437

PCT Pub. Date: May 15, 2003

(65) Prior Publication Data

US 2005/0025188 A1  Feb. 3, 2005

(51) Int. Cl.
*H04W 4/00* (2009.01)
*H04J 1/00* (2006.01)

(52) U.S. Cl. ........................ 370/333; 370/490

(58) Field of Classification Search ............... 370/490, 370/535, 313, 349, 346, 913, 333, 218, 352–356, 370/394, 395.94, 473, 319–322, 326, 336–337; 455/6.3, 575, 352, 353, 550, 554, 555, 8.3; 379/102.02, 102.03; 348/8, 734, 705, 706; 341/176; 395/200.52, 200.58, 200.67; 709/237, 709/222, 228, 253, 243

See application file for complete search history.

(56) References Cited

U.S. PATENT DOCUMENTS

| 5,825,430 | A | 10/1998 | Adolph et al. | |
|---|---|---|---|---|
| 5,862,452 | A * | 1/1999 | Cudak et al. | 725/81 |
| 6,058,106 | A * | 5/2000 | Cudak et al. | 370/313 |
| 6,088,337 | A * | 7/2000 | Eastmond et al. | 370/280 |
| 7,263,089 | B1 | 8/2007 | Hans et al. | |
| 2001/0043577 | A1* | 11/2001 | Barany et al. | 370/328 |
| 2002/0099854 | A1* | 7/2002 | Jorgensen | 709/249 |
| 2003/0053440 | A1 | 3/2003 | Gruhn et al. | |
| 2005/0025134 | A1* | 2/2005 | Armistead | 370/352 |
| 2009/0103514 | A1 | 4/2009 | Hwang et al. | |

FOREIGN PATENT DOCUMENTS

| CN | 1255032 A | 5/2000 |
|---|---|---|
| CN | 1271498 A | 10/2000 |
| DE | 199 58 510 A1 | 6/2001 |
| EP | 0 772 316 A2 | 5/1997 |
| EP | 0 772 316 A3 | 5/1997 |
| JP | 9-55776 | 2/1997 |

(Continued)

OTHER PUBLICATIONS

"Multiplexing", Wikipedia, URL: http://en.wikipedia.org/wiki/Multiplexing>, XP002513959, Feb. 5, 2009, 5 pages.

*Primary Examiner*—Melody Mehrpour
(74) *Attorney, Agent, or Firm*—Oblon, Spivak, McClelland, Maier & Neustadt, L.L.P.

(57) ABSTRACT

In a VoIP system that employs the AMR coding system, by classifying packets by means of unequal error protection implemented during data coding based on the AMR coding system, and by transmitting packets through transport channels 26 corresponding to the required quality for the respective packets, an efficient and high-quality mobile communication system is obtained.

12 Claims, 25 Drawing Sheets

FOREIGN PATENT DOCUMENTS

| | | |
|---|---|---|
| JP | 10-257097 | 9/1998 |
| JP | 11-251988 | 9/1999 |
| JP | 11-331123 | 11/1999 |
| WO | WO 99/16264 | 4/1999 |
| WO | WO 99/22547 A2 | 5/1999 |
| WO | WO 99/22547 A3 | 5/1999 |
| WO | WO 99/66736 A2 | 12/1999 |
| WO | WO 99/66736 A3 | 12/1999 |
| WO | WO 01/62021 A2 | 8/2001 |
| WO | WO 01/62021 A3 | 8/2001 |

* cited by examiner

Fig. 2
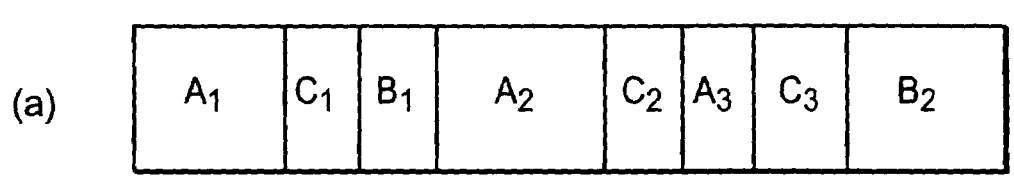
(a)
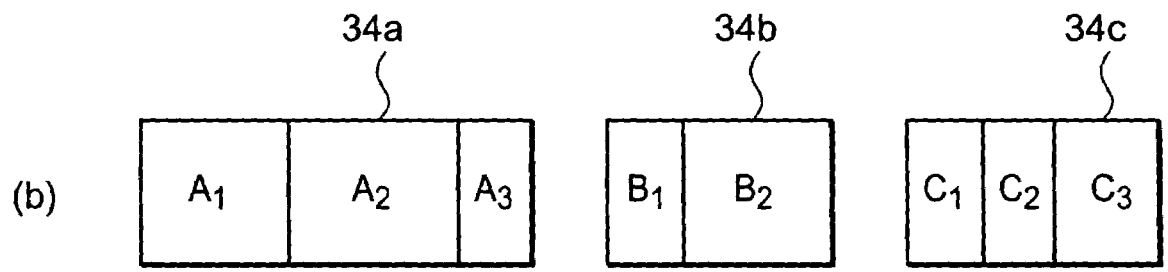
(b)

WIRELESS COMMUNICATION METHOD AND MOBILE TERMINAL USED THEREFOR

TECHNICAL FIELD

The present invention relates to wireless communication methods for selecting transfer quality depending on the importance of transmission data and to mobile terminals therefor.

BACKGROUND ART

In recent mobile communication systems, the realization of multimedia wireless terminals capable of transmitting not only voice alone or data alone but also moving pictures has been anticipated. For this purpose, it is necessary to simultaneously transmit signals having diverse communication characteristics, for example, communication characteristics such as those of voices, in which slightly higher error rates are allowable, but large unevenness in transmission lag time are not. A contrasting example is communication characteristics such as those of typical data, in which unevenness in transmission lag time is not a problem, but the occurrence of communication errors is not permitted. In this regard, conventional arts provide methods, such as those wherein channel control information is communicated at high-quality, or wherein transmission quality is differentiated based on data type.

For example, FIG. 26 is a block diagram of a conventional mobile communication system disclosed in Japanese Laid-Open Patent Publication 1998-257097. Japanese Laid-Open Patent Publication 1998-257097 relates to broadband digital wireless systems that transmit data through channels corresponding to the quality required for transmission data by dividing a broadband channel into a plurality of narrowband channels and constantly monitoring the error rate of each narrowband channel. In FIG. 26, at 2101 is a transmission terminal; at 2102, a reception terminal; at 2201a, a transmission wireless module inside the transmission terminal 2101; at 2201b, a reception wireless module inside the reception terminal 2102; at 2202a, a transmission interface; at 2202b, a reception interface; at 2203a, a transmission modulator; at 2203b, a reception demodulator; at 2204a, a transmission controller; at 2205a, a transmission demodulator; at 2205b, a reception modulator; at 2206a, a transmission error detecting/collecting unit; at 2206b, a reception error detecting/correcting unit; at 2207, a broadband channel; at 2208 and 2209, narrowband channels that are divisions of the broadband channel 2207; at 2208, control channels; and at 2209-1 through 2209-n, data transmission channels.

For a clearer understanding, FIG. 26 principally illustrates transmission-related functional blocks in the transmission wireless module 2201a and reception-related functional blocks in the reception wireless module 2201b. The operation of the conventional mobile communication system will be now discussed. In the present conventional example, the broadband channel 2207 is divided into the narrowband channels 2208 and 2209. The interface 2202a of the wireless module 2201a temporarily stores data that the transmission terminal 2101 is to send to the reception terminal 2102. The stored data undergo predetermined modulation processing in the modulator 2203a and are then transmitted to the terminal 2102 through the transmission channels 2209-1, 2 and 3 set by the controller 2204a. The quality of transmission channels not used for data transmission is monitored by periodically transmitting test signals therethrough.

Signals received by the wireless module 2201b are demodulated by the demodulator 2203b and are stored in the error detecting/correcting unit 2206b before being outputted to the terminal 2102. Meanwhile, the error rate of each of the transmission channels 2209-1 through 3 and the error rates of the other transmission channels, which are detected by means of the test signals, are transmitted, as part of the control information, from the terminal 2102 to the terminal 2101 through the control channel 2208.

In the wireless module 2201a, the controller 2204a decides transmission conditions and transmission channels by comparing received error rate information (channel quality) regarding transmission channels with communication characteristics necessary for sending data.

As discussed above, optimal communication is carried out by feeding back the quality of each narrowband channel each time data signal is transmitted, and by satisfying communication characteristics required by the data.

In this manner, feed-back loops that periodically monitor the quality of channels are formed by transferring data and test signals and sending back the error rate information of the transferred data. These feed-back loops are referred to as monitoring periods. In the broadband communication system of the conventional example, transmission conditions (such as data rate, error control method, and wireless packet size) are modified depending on changes in the quality of the channels and the required communication characteristics. In order to decode signals correctly, these transmission conditions need to be sent by transmission terminals to reception terminals, and the setting for a demodulating circuit needs to be modified by the reception terminals in response to these transmission conditions.

In the conventional art described above, especially in wireless zones where data are more likely to suffer losses, due to noise and interference, than in cable zones, when a series of packets was transmitted, a plurality of transmission paths that were different in transmission quality were set for control channels and for data transmission channels, and transmission conditions were modified in response to changes in channel quality and required communication characteristics.

Even among the same kinds of data, such as call voices, there are some important portions where, when losses and errors occur, critical distortions arise in the voices reproduced at the reception side, while there are other portions where voice quality is not affected even when losses occur; however, the selection of transmission quality based on the importance of these portions was not feasible because these portions are typically intermingled in a series of data.

Accordingly, when the important portions suffered losses, the improvement in voice quality could not be implemented and efficiency was low even when the unimportant portions were successfully transmitted. The present invention was implemented in order to address the problems discussed above and to perform, through transmission paths that are different in transmission quality, the transmission of packets created by classifying the same kinds of data according to their importance.

For example, in cases where, with a header and a payload within a single packet, high quality is required for the header while low quality is acceptable for the payload, when the total packet is transmitted through a transmission path where the required demands are high because no means for separately transmitting the header and the payload is available, there is a problem in that the transmission is expensive, because transmission paths where the quality demands are high are utilized even for payloads. In contrast, when the total packets are transmitted through a transmission path where the demands required by the payloads are low, the possibility of incorrect routings for control information increases due to losses in the headers. In these cases, even though the routing for the payload is correctly implemented, its data are wasted; therefore, there has been a problem in that as the possibility of losses of each packet increased, wireless resources between mobile terminals and base stations have been wasted. In order to cope with this problem, the present invention divides packet segments within a single packet further into a header and a payload, and transmits the header through a transmission path whose required quality is high, and the payload through a transmission path whose required quality is low.

DISCLOSURE OF INVENTION

The present invention relates to communication methods for mobile communication systems, wherein packet communication is implemented through a plurality of transport channels that are allocated as a wireless channel and different in quality; and for high-reliability mobile communication systems, wherein when data to be transmitted are converted into packets, because packets are formed by classifying the data based on the classification of contents of the data by means of unequal error protection and the packets are transmitted through the transport channels having the quality corresponding to the classes of the packets, high-importance information is securely transmitted to the reception side. Moreover, the present invention is communication methods for mobile communication systems, wherein a single packet is divided into a plurality of packet segments according to importance of data contents; the same identification numbers are added to the plurality of packet segments; the plurality of packet segments are transmitted through the transport channels having the quality corresponding to the importance; the plurality of packet segments are identified based on the identification numbers and are re-synthesized into the single packet; therefore, wireless resources are effectively utilized.

BRIEF DESCRIPTION OF DRAWINGS

FIG. 2 is a view illustrating a method for forming packets according to Embodiment 1;

BEST MODE FOR CARRYING OUT THE INVENTION

Embodiment 1.

Embodiment 1 of the present invention relates particularly to transmission/reception of call voices and to mobile communication systems that carry out communication, selecting different quality transmission paths depending on the importance of call voice data.

Figure 1:
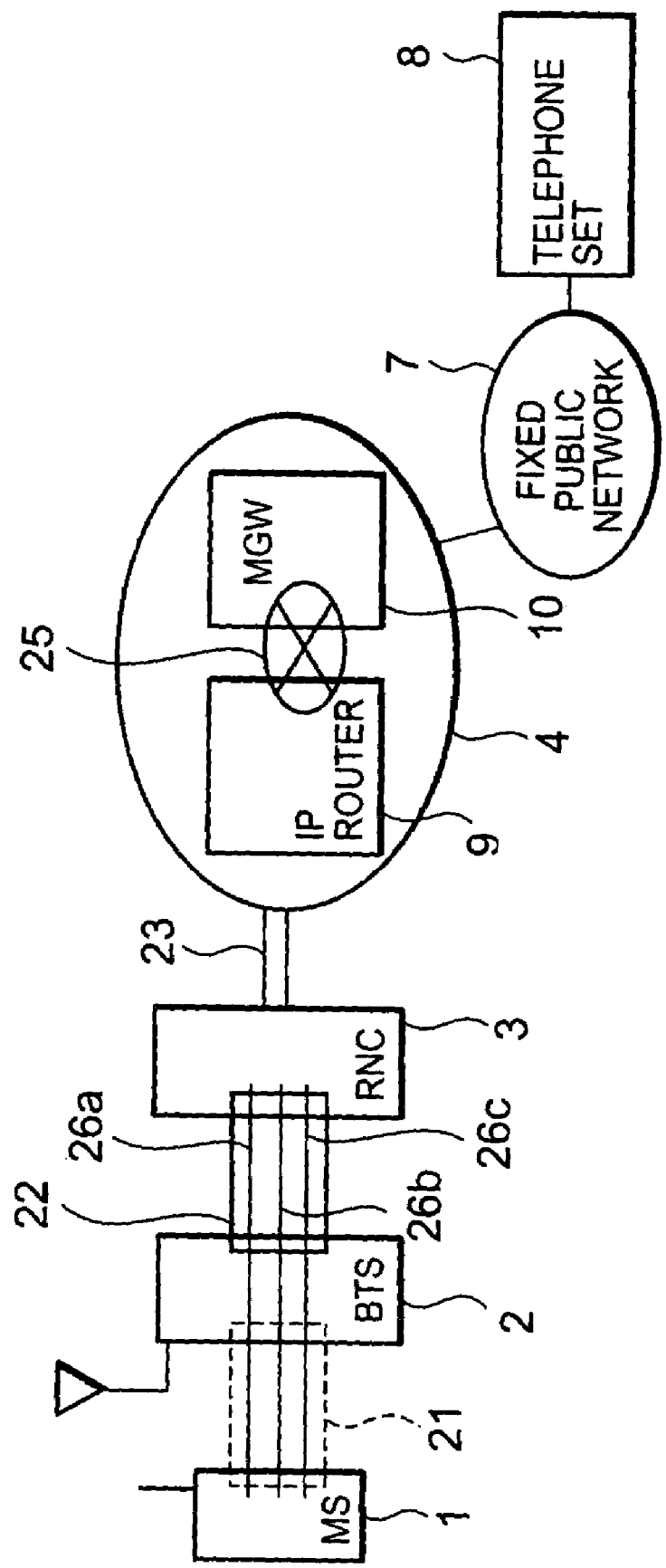
FIG. 1 is a block diagram illustrating a configuration of a mobile communication system according to Embodiment 1 of the present invention.

Embodiment 1 will be discussed below. FIG. 1 is a block diagram illustrating a system configuration when a mobile communication system according to Embodiment 1 of the present invention is applied to a Voice over IP (referred to as VoIP hereinafter) system. A VoIP system denotes technology that implements voice calls over the Internet and has objectives such as lowering communication costs by integrating the infrastructure for telephone networks with data networks so as to raise channel operation rates.

In FIG. 1, at 1 is a VoIP-communicable mobile terminal that has an IP address and employs as a communication system IMT-2000 (International Mobile Telecommunications-2000) system; at 2, a base station; at 3, a base-station controller; at 4, a core network; at 7, a fixed public network; at 8, a telephone set; at 9, an IP router; at 10, a media gateway; at 21, wireless channels; at 22, cable channels; at 23, cable channels between the base station controller and the core network; at 25, a transport network through which data transmission between the IP router 9 and the media gateway 10 is carried out; at 26a, 26b and 26c are respective transport channels arranged over the wireless channels 21 and the cable channels 22 between the base-station controller and the base station, wherein required bit error rates (referred to as required quality hereinafter) are in advance, set prior to the beginning of communication, and the required quality is satisfied by means of error correction coding and rate matching that will be described later. In this case, it is assumed that the required quality of the transport channels 26a, 26b and 26c are higher in that order.

In Embodiment 1 of the present invention, as the voice coding system, the Adaptive Multi-Rate (referred to as AMR hereinafter) system is utilized, which was employed as a voice coding system of the W-CDMA standard that is a Japanese-European standard for the third-generation mobile telephone system.

The AMR is an algebraic CELP (Code Excited Linear Prediction) coding system that has 8 coding rates and utilizes simple algebraic codes as a noise codebook, and for error tolerance processing, is provided with the capability of classifying coded data for unequal error protection. When data includes some portions of information which are more important than other portions, the occurrence of errors in the more important portions has a crucial effect on the following processes; therefore, the unequal error protection is adapted to protect these important portions more intensively against errors. For example, even within a series of call voices, there are some portions that are important so as to be recognized as voices at reception sides and produce big distortion in decoded voices when losses and errors occur therein, and there are other portions that do not bring about any relatively big effects on the quality of reproduced voices even though losses and errors occur therein; therefore, the importance differs depending on the portion. With the AMR system, a series of voice data is classified into portions A, B, and C in that order, according to their importance. In Embodiment 1, as illustrated in FIG. 2(c), payloads 34a, 34b, and 34c are formed by extracting data after extracting them class by class from AMR-coded voice data illustrated in FIG. 2(a), and the packet transmission is implemented by transmitting the payloads 34a, 34b, and 34c, each of which is made up of only the classified portion, through the respective transport channels 26 having the required quality corresponding to the class.

Figure 3:
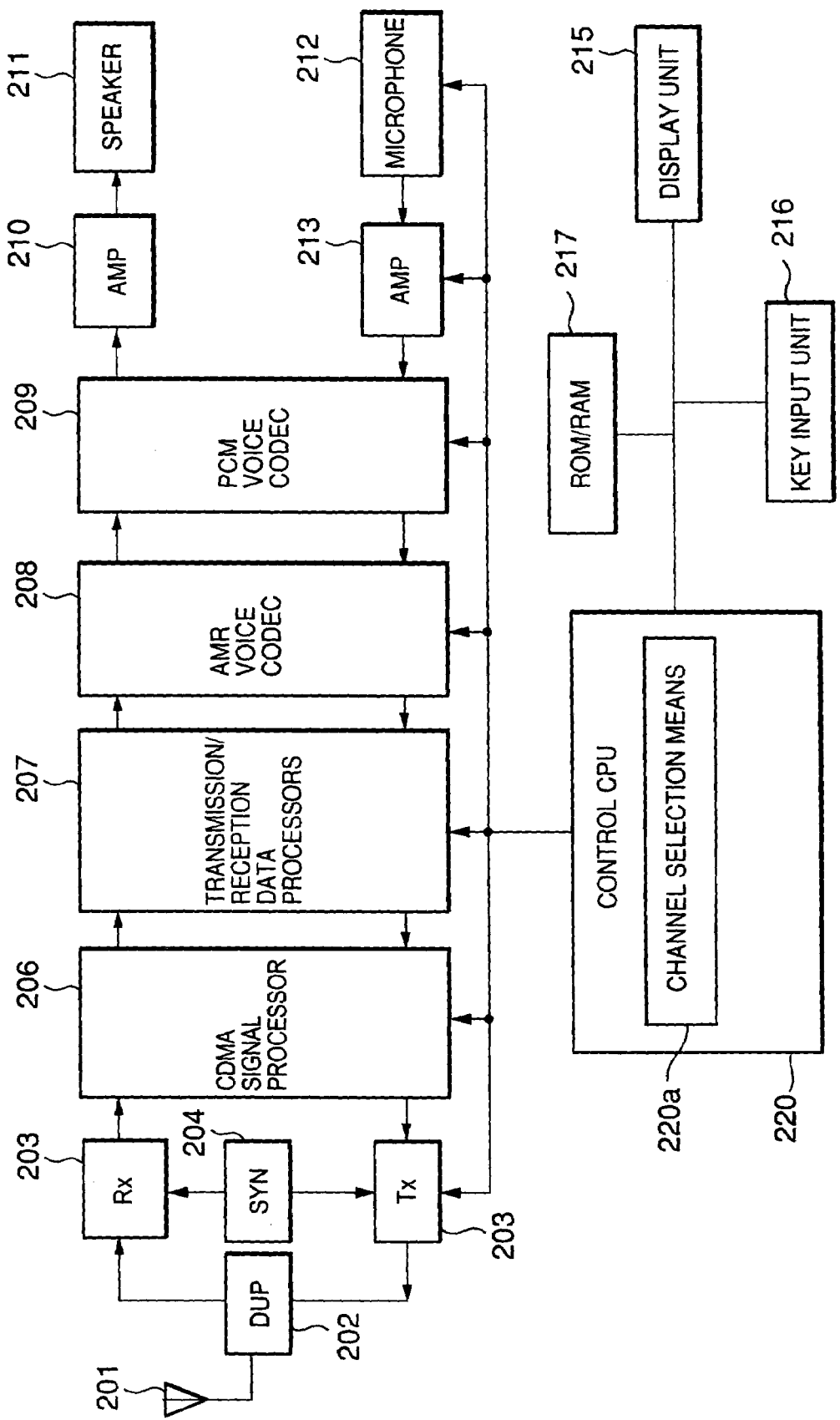
FIG. 3 is a view illustrating a system configuration of a mobile terminal according to Embodiment 1.

FIG. 3 is a block diagram illustrating a system configuration sample of the mobile terminal 1. At 201 is an antenna; at 202, an antenna duplexer; at 203, a reception circuit (Rx); at 204, a frequency synthesizer (SYN); at 205, transmission circuitry (Tx); at 206, a CDMA signal processor; at 207, a transmission/reception date processor; at 208, an AMR voice codec; at 209, a PCM voice codec; at 210 and 213, amplifiers; at 211, a speaker; at 212, a microphone; at 215, a display unit; at 216, a key input unit; at 217, a pair of a ROM and a RAM; and at 220, a control CPU, including as a new function a channel selection means 220a that transmits respective packets, depending on the classes, in order to apply the unequal error protection to AMR-coded voice data.

Discussing the transmission system firstly, a speaker's transmission signals inputted through the microphone 212, after being amplified by the amplifier 213, are inputted to the PCM voice codec 209 so as to be converted by means of PCM voice coding processing into digital transmission signals, and are then inputted to the AMR voice codec 208.

In AMR coding, the AMR voice codec 208 classifies on a class-by-class basis, as illustrated in FIG. 2(c), voice data such as those in FIG. 2(b) through the classification for the unequal error protection discussed above, and inputs the classified voice data to the transmission/reception date processor 207.

The transmission/reception data processor 207 sequentially adds control information that is inputted by the control CPU 220 to respective headers 33a, 33b, and 33c of packets 31a, 31b, and 31c, and inputs the packets to the CDMA signal processor 206 after protocol processing described later. In this situation, as a new function, the channel selection means 220a of the control CPU 220 selects, depending on the class of each packet, the transport channels 26a, 26b, or 26c, each of which differs in required quality, and performs the allocation in such a way that class A packets 31 are transmitted through the transport channel 26a whose required quality is high, and class C packets through the transport channel 26c whose required quality is low.

The CDMA signal processor 206 controls parameters for error correction coding methods, rate matching, and the like so as to satisfy the quality required in the transport channels 26, according to the control of the CPU 220 controller, and, by executing quadrature modulation and the like on each packet 31 after spread processing utilizing codes allocated by the base station system 2, creates intermediate frequency signals for transmission.

The intermediate-frequency signals are converted into wireless-frequency signals by being mixed in the transmission circuitry 205 with local-oscillation signals originating in the frequency synthesizer 204, and then are inputted by way of the antenna duplexer 202 to the antenna 201 that transmits the wireless-frequency signals to the base station system 2.

Discussing the reception system, wireless-frequency reception signals having the packets 31 classified depending on the classes, which are transmitted from the base station 2 through the transport channels 26, are received by the antenna 201, and then inputted to the reception circuitry 203 by way of the antenna duplexer 202. In the reception circuitry 203, the aforementioned reception signals are converted into signals of the intermediate frequency signals by being mixed with reception local-oscillation signals outputted by the frequency synthesizer 204. In addition, the frequencies of the foregoing reception local-oscillation signals outputted by the frequency synthesizer 204 are specified by control signals outputted by the control CPU 220.

The foregoing intermediate-frequency reception signals are inputted to the CDMA signal processor 206. The CDMA signal processor 206, the operation of which is controlled by the control CPU 220, makes up the packets 31 addressed to its own station by applying CDMA signal processing such as quadrature demodulation and reverse spread processing to the foregoing intermediate-frequency reception signals.

Each class packet 31 made up in the CDMA signal processor 206 is inputted to the transmission/reception date processor 207 to be divided into the header 33 and the payload 34. Among these headers and payloads, the headers 33, including various types of control information, are inputted to the control CPU 220 after being separated from the payloads 34, and the payloads 34 are inputted to the AMR voice codec 208 according to instructions from the control CPU 220, which depend on the control information of the headers 33.

The AMR-coded voice data of the payloads 34a, 34b, and 34c inputted to the AMR voice codec 208 are inputted to the PCM voice codec 209 after being converted into the PCM-coded voice data;

the PCM-coded voice data are converted into analog voice signals, and then outputted through the speaker 211 after being amplified by the amplifier 210.

As discussed above, while controlling each unit integrally, the control CPU 220 is adapted to engage in the control for communication with the base station, establishing communication links; as a new control function, the selection means 220a can be referred to, which selects, according to the classes, the transport channels 26 that transmit the packets 31 formed through AMR-system classification in the transmission/reception date processor 207.

FIG. 4(a) represents a hierarchical structure of the protocol processing implemented in the transmission/reception data processor 207 of the mobile terminal 1, and FIG. 4(b) is a view illustrating the packet configuration in each of layers. Typically, procedures and prescripts (protocols) are made up in line with the standard model referred to as OSI (Open System Interconnection); so too the VoIP system is made up in line with the OSI model. The OSI model consists of seven layers, i.e., a physical layer, a data link layer, a network layer, a transport layer, a session layer, a presentation layer and an application layer.

The physical layer is in charge of the maintenance and management of actual transfer media; the data link layer, of recognition of packets from electric signals in the physical layer; the network layer, of providing transmission paths between terminals; the transport layer, of ensuring the communication quality; the session layer, of initiation and termination of transmission; the presentation layer, of conversion of packets into various data; and the application layer is in charge of actual data processing.

Figure 4:
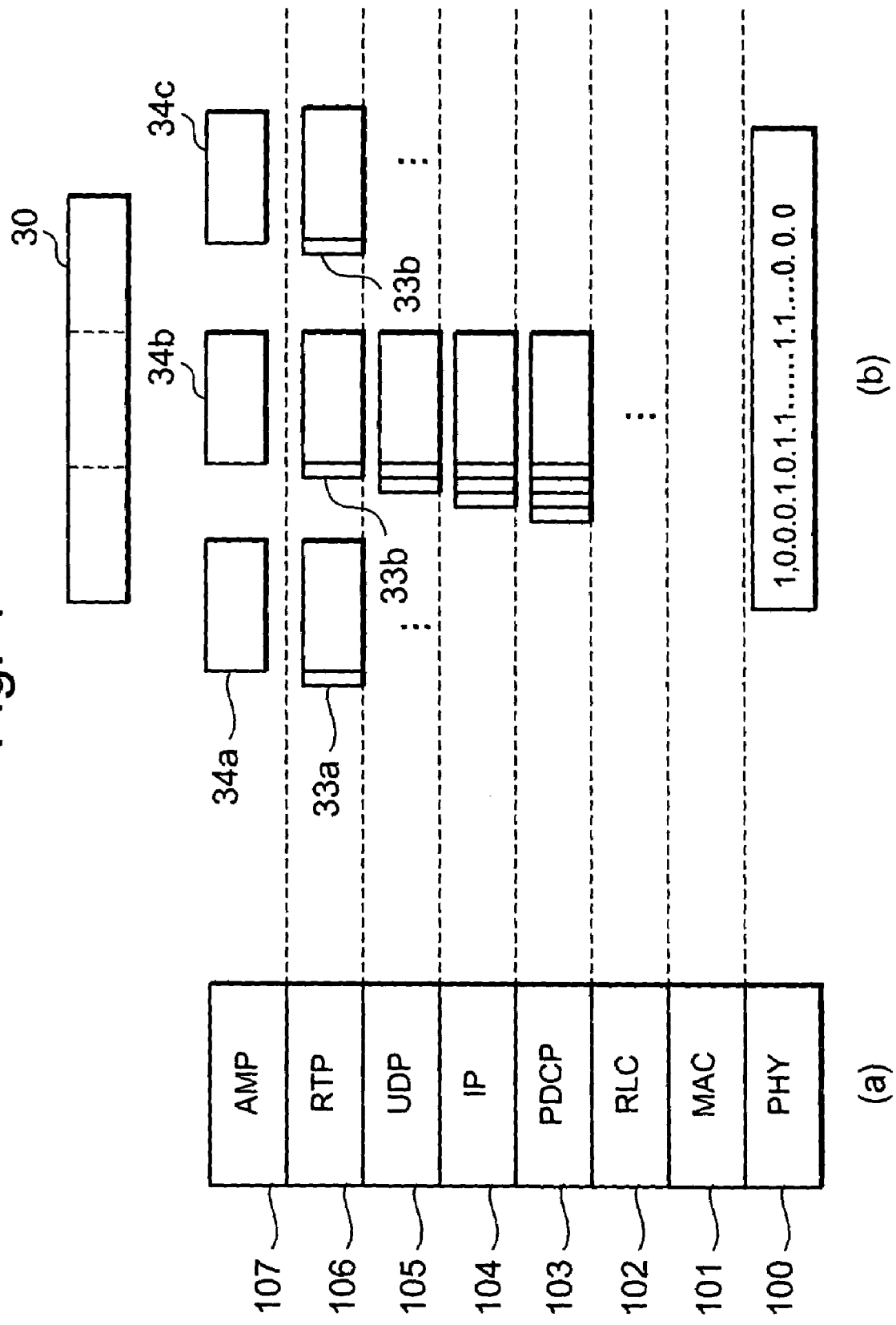
FIG. 4 is a view illustrating a hierarchical structure of protocols for the mobile terminal according to Embodiment 1.

In FIG. 4, at 100 is a physical layer including the antenna 201, the antenna duplexer 202, the receiver 203, the transmitter 205, the frequency synthesizer 204, and the CDMA signal processor 206; at 101, a Media Access Control (MAC) layer that is part of the data link layer; at 102, a Wireless Link Control (RLC) layer that is part of the data link layer and corrects errors by means of retransmission; at 103, a Packet Data Convergence Protocol (PDCP) layer that is part of the data link layer and applies RLC mapping to each data unit in the network layer; at 104, an Internet Protocol (IP) layer that is a protocol for the network layer; and at 105, a User Diagram Protocol (UDP) layer characterized in that the UDP protocol, which is a protocol for the transport layer, enables IP packets in the immediate lower layer to be almost directly utilized by upper-layer applications, and simple and high-speed processing is implemented. At 106 is a Real-time Transfer Protocol (referred to as RTP hereinafter) layer that is a protocol for the transport layer and is suitable for communicating images and voices in real time; at 107, a AMR layer that engages in the AMR-system voice coding/decoding and adds importance information to headers after forming packets depending on the class of unequal error protection in coding; and at 30, inputted voice data.

In addition, in the RTP layer 106, RTP protocol and its sub-protocol "Real-time Transfer Control Protocol (referred to as RTCP hereinafter)" are utilized. RTP is a transport-layer-protocol that decides the communication quality and performs neither retransmission control nor busy control during data transmission so as to lighten the burden on the protocol processing. RTCP is a protocol to support RTP; it periodically evaluates the quality of channels so as to implement real-time transmission commensurate with the bandwidth of the channels.

The Mac layer 101 through the RTP layer 106, which are above the physical layer 100, are implemented mainly by the cooperation between the transmission/reception data processor 207 and the control CPU 220. The protocol of each layer is made up as discussed above, and each layer conveys packets to be communicated to the adjacent layer, adding header information to the packets upon transmission, and eliminating it from the packets upon reception.

For instance, in the case of transmission from the mobile terminal 1, as illustrated in FIG. 4(b), the series of voice data 30 inputted through the microphone 212 is packeted after being coded and digitalized through AMR-system coding in the protocol processing of the AMR layer 107, carried out by the voice code processor 209, and after being categorized on the basis of the class; the formed payloads 34a, 34b and 34c with importance information 32a, 32b, and 32c being added thereto, as described above, are conveyed to the RTP layer 106.

In this situation, focusing attention on the payload 34b for the sake of convenience, in the RTP layer 106, the packet 31b, including the payload 34b and the header 33b to which information such as data type of the payload 34b (voice, in this case) and a time stamp is added, is conveyed to the lower layer, i.e., the UDP layer 105.

In the UDP layer 105, UDP header information is also added to the header 33b of the packet, and then the packet is conveyed to the IP layer 104; n the IP layer 104, the foregoing packet, with IP addresses of the transmitter and the receiver, a Time To Live (TTL) that denotes a life time of the packet in network, and the like being added, is conveyed to the lower layer, i.e., the PDCP layer 103.

In the PDCP layer 103, in addition to the functions of the conventional PDCP layer, such as compression of RTP, UDP, and IP headers, and addition of a packet ID as a PDCP header for the identification of the aforementioned compression system, the transmission quality of the packet is decided based on the packet class, which is a characteristic of Embodiment 1.

In the RLC layer 102, error correction is carried out by means of retransmission; however, in the case of the present embodiment, because the retransmission control upon transmission is not executed, no RCL header is required; thus, the data are directly conveyed to the MAC layer 101. By way of the MAC layer 101, the data are finally converted in the physical layer 100 into wireless signals, and then are transmitted toward the receiving party.

In contrast, in the case of reception, packets are sequentially processed in the order from the lowest to the highest layer; and in the highest layer, i.e., the AMR layer 107, as discussed above, the packets are decoded through the AMR codec 208 and voice reproduction is carried out. The transmission/reception of the packets is implemented after the foregoing protocol processing.

Figure 5:
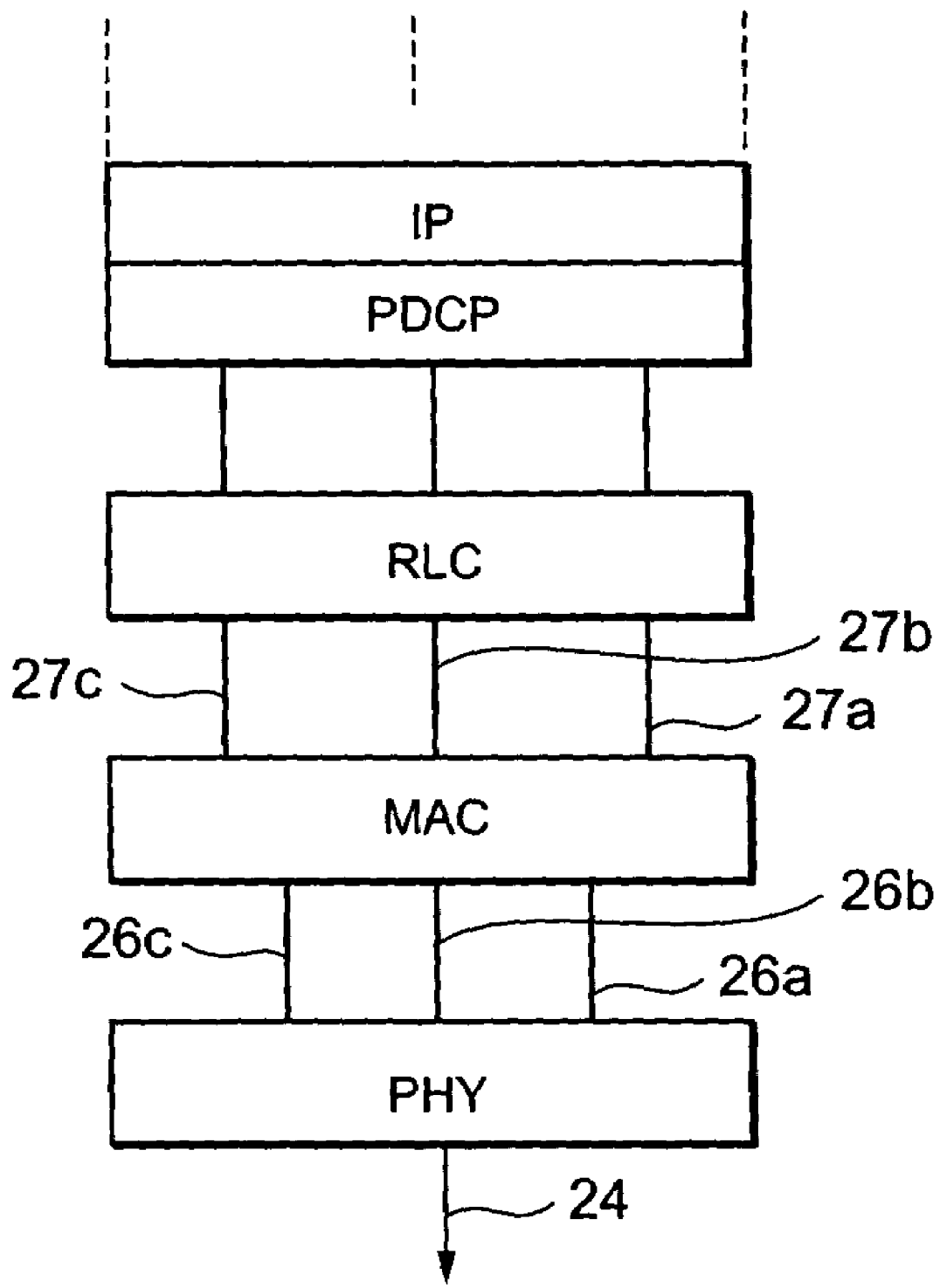
FIG. 5 is a view illustrating channel configurations between protocol layers according to Embodiment 1.

FIG. 5 is a view representing the channel structure between respective layers. The channel structure of IMT-2000-based wireless interfaces is made up of three layers, including the physical, transport, and logic channels. In FIG. 5, at 24 is a physical channel; at 26, a transport channel; and at 27, a logic channel; the same constituent elements as those in FIG. 4 are indicated by the same reference marks.

The logic channel 27 is one provided between the MAC layer 101 and the RLC layer 102. The logic channels 27 are classified based on the functions and logic properties of transfer signals and are characterized by the contents of data to be transmitted. The transport channel 26 is provided between the physical layer 100 and the MAC layer 101. The transport channels 26 are classified based on transfer modes and are characterized by what type of information is transmitted under which level of required quality, by way of the wireless interface.

In Embodiment 1, the transport channels 26 and the higher channels, i.e., the logic channels 27, are connected in one-on-one relationships; the MAC layer 101 only conveys packets to its adjacent layer—the RLC layer 102 or the physical layer 100—without multiplexing or separating channels in particular; the RLC layer also conveys the packets without carrying out implementing protocol processing in particular, such as addition of a header and the like, because the retransmission control or the like is not implemented therein; therefore, the allocation of the packets to the transport channels depending on the classes of the packets is carried out in the PDCP layer 103.

The physical channels 24 are categorized with regard to the functions of the physical layer 100 and are specified by spread codes and spread frequencies, and moreover, in the case of transmission, by modulation phases. FIG. 5 illustrates cases where only a single physical channel exists. Provision is made for the multiplexing of user data with control information or for the multiplex transfer of a plurality of user data arising from multiple calls, by multiplexing data of a plurality of transport channels 26 in the physical channel 24.

The physical channel 24 is a wireless channel having a constant bit rate (12.2 kbps for a voice call system, for example). In the MT-2000 system, spread codes are periodically utilized in the physical channel 24 so as to distinguish one user from others; in other words, the multiplexing of each transport channel 26 in the physical channel 24 denotes multiplexing data of each transport channel 26 in the intervals in which the spread codes are repeated (referred to as wireless frames hereinafter).

Figure 6:
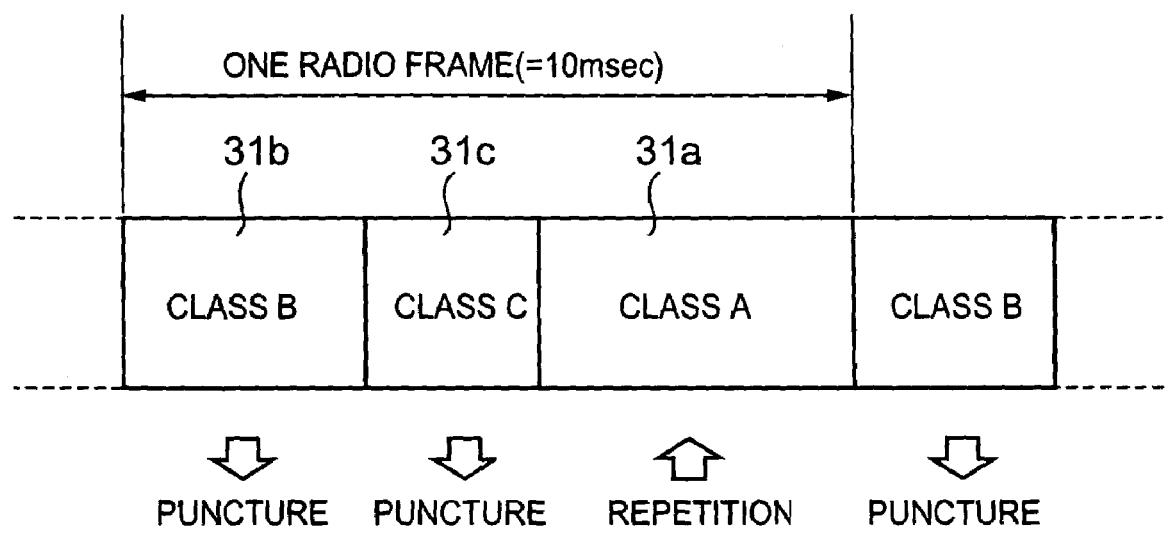
FIG. 6 is a view of multiplexing of transport channels into a physical channel.

FIG. 6 represents a radio frame in which the packet of each transport channel 26 is multiplexed. As illustrated in FIG. 6, the number of bits included in a radio frame (10 ms for example) is decided by the data rate; more bits are allocated to a data block (a packet of the foregoing class A) of the transport channel 26 whose required quality is high, and fewer bits, to a data block (a packet of the foregoing class C) of the transport channel 26 whose required quality is low. The number of bits allocated to the transport channel 26 can be flexibly changed by means of error correction coding or rate matching, which will be discussed later.

In addition, in one radio frame on the reception side, an identification number is stored in the control information of the data block of each transport channel 26 so that which data belong to which transport channel 26 can be recognized.

Which number signifies which transport channel 26 is conveyed in advance from the base station controller 3 to the mobile terminal 1 when transmission is initiated.

Figure 7:
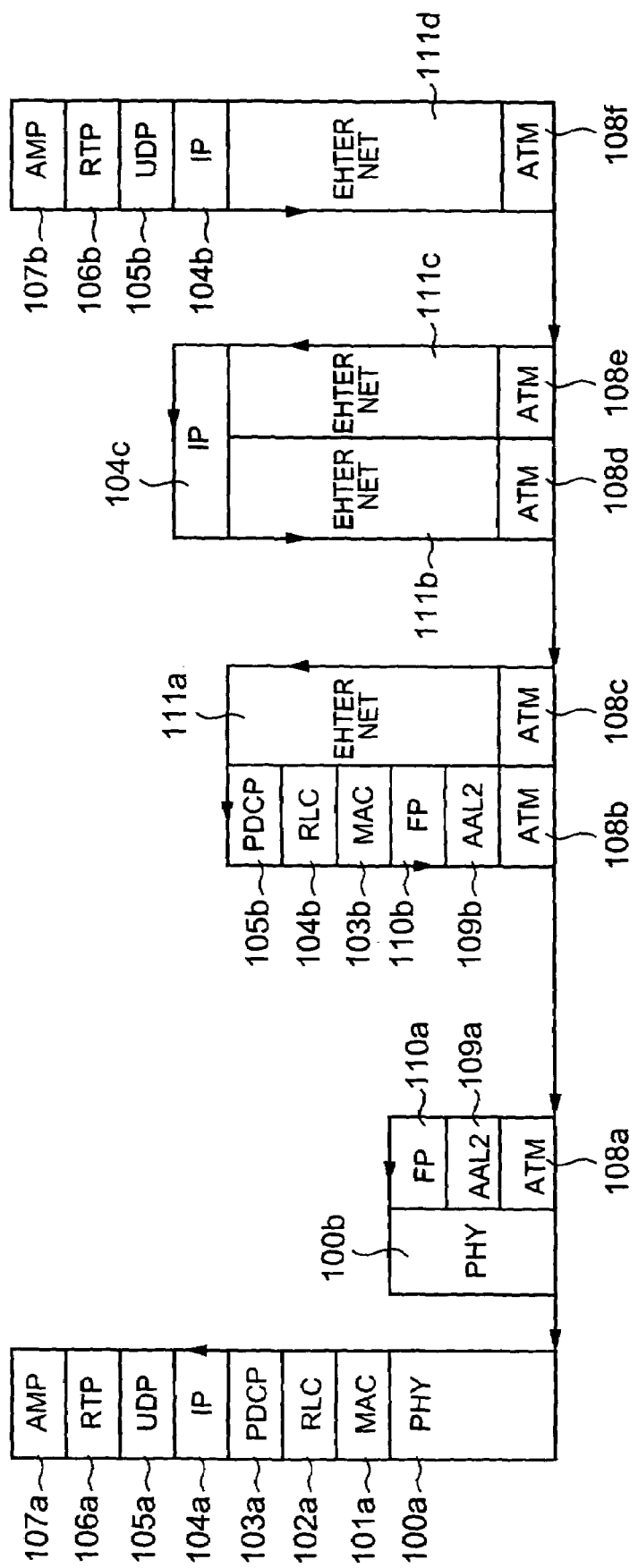
FIG. 7 is a view illustrating hierarchical structures of protocols for each of constituent devices of the mobile communication system according to Embodiment 1.

FIG. 7 is a view illustrating protocol stacks for respective constituent devices in a mobile communication system of the present invention. The same constituent elements as those in FIG. 2 are indicated by the same reference marks.

At 108 is an Asynchronous Transfer Mode (ATM) layer that simultaneously transfers different types of traffic such as voices, pictures, and data, by means of a 53-byte cell (a 5-byte header and a 48-byte payload); at 109 is an ATM Adaptation Layer type 2 (AAL2) layer that is a protocol adapted to translate in the transmitter the traffic from higher protocols into a size-format that can be stored in an ATM-cell payload and to restore to the original form in the receiver. The type 2 deals with variable-speed voices and pictures. At 110 is a Frame Protocol (FP) layer that deals with wireless transmission/reception timing, bit error rate information upon reception (referred to as reception quality hereinafter), and the like; at 111, communication channels implemented by Ethernet or the like.

The mobile terminal 1 has the protocol stack set forth in FIG. 4. The base station system 2 assembles in the AAL2 layer 109*a* data transmitted from the base station controller 3 into packets, and decides in the FP layer 110*a* transmission quality of the wireless channels and transmission timing, depending on the information stored in FP headers, and then transmits the packets to the mobile terminal 1 by way of the physical layer 10*b*. In contrast, in cases where data are transferred from the mobile terminal 1, the packets conveyed by the physical layer 10*b* are transferred to the AAL2 layer 109*a* with reception timing being recorded in the FP headers in the FP layer 110*a*, and then the packets are transmitted by means of ATM after being converted into ATM cells in the AAL2 layer 109*a*.

In addition, in the base station controller 3, the section facing the base station 2, which is made up of a PDCP layer 103*b*, a RLC layer 102*b*, a Mac layer 101*b*, a FP layer 110*b*, an AAL2 layer 109*b* and an ATM layer 108*b*, has a layer structure in which transmission of data to the IP router 9 is implemented in an asynchronous transfer mode through LAN channels such as Ethernet.

Only a single IP router 9 is illustrated in FIG. 1; in fact, a plurality of IP routers 9, connected with each other through LAN channels such as Ethernet, forms the core network 4; the header 33 of the packet 31 is read in an IP layer 104*c*; and the data are transmitted in the asynchronous transfer mode to the IP router 9 that is the next destination, based on the addresses of the receiver and the transmitter.

The media gateway 10 is a device that connects with a fixed public network and performs interconversion between data such as voices from the fixed public network and IP packets. Higher-level layers of an Ethernet 111*d* include an IP layer 104*b*, a UPD layer 105*b*, an RTP layer 106*b*, and an AMR layer 107*b*; in the AMR layer 107*b*, voices coded by means of the PCM system in the telephone set 8 are coded by means of the AMR system; in cases where the communication is implemented from the mobile terminal 1 to the telephone set 8, AMR-coded voices are converted into PCM-coded voices, and the voices are transmitted to the respective opponent devices. In this situation, upon the AMR-based coding or decoding, packets are formed based on the classification as illustrated in FIGS. 2(*a*) and 2(*b*). In the case of transmission to the base station controller 3, the packets are transmitted with importance information added to the IP headers, in the IP layer 104*b*; the importance information is for selecting the quality of the transport channels 26 used for the transmission from the base station controller 3 to the mobile terminal 1. The importance information is for selecting in the base station controller 3 the transport channels 26 and is added only when the packets are transmitted from the media gateway 10 to the base station controller 3; however, the packets are transmitted to the mobile terminal 1 with the importance information being eliminated because the importance information is unwanted data after the transport channels have been selected in the PDCP layer 103*b* of the base station controller 3.

In contrast, with regard to the classified packets 31 transmitted from the mobile terminal 1, the addition of the importance information is not necessary because both packeting coded voice data and selecting channels are implemented within a single device.

Figure 8:
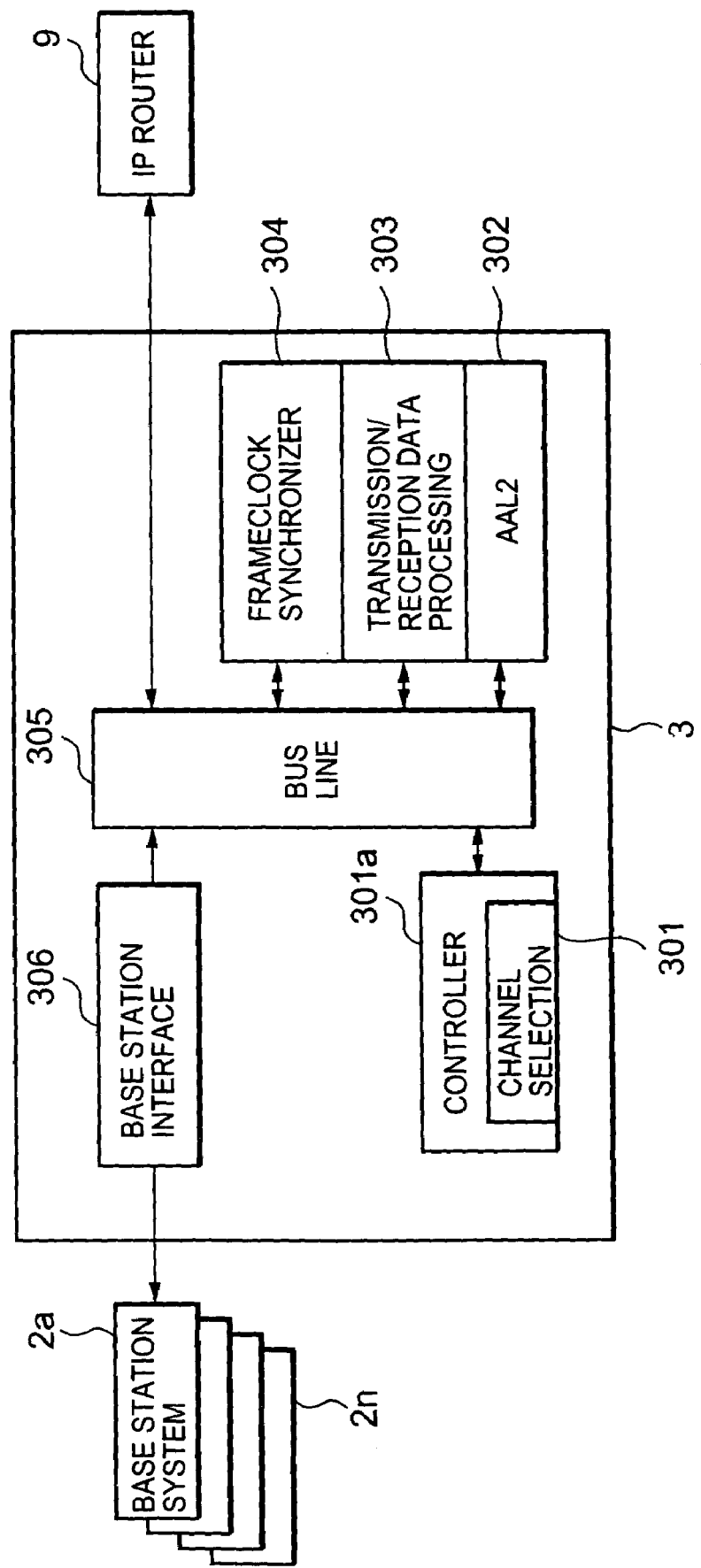
FIG. 8 is a view illustrating a system configuration of a base-station control system according to Embodiment 1.

FIG. 8 is a block diagram illustrating principal parts of a configuration example for the base station controller 3. The base station controller 3 contains a controller 301, an AAL2-layer separator/synthesizer 302, a transmission/reception data processor 303, a frameclock synthesizer 304, bus lines 305 and a base station interface 306.

For example, ATM cells of user information (voice and the like) transmitted from the telephone set 8 by way of the media gateway 10 and the IP router 9 are assembled in the AAL2-layer separator/synthesizer 302 into the packets 31; the header information 33 separated from the packet 31 in the transmission/reception data processor 303 is sent to the controller 301; the controller 301 selects in the PDCP layer 103*b* the transport channels 26 based on the importance information added in the media gateway 10; and the user information is transmitted by way of the bus line 305 and the base station interface 306 to respective base station systems 2*a* through 2*n* in cells where receivers exist. The controller 301 engages in control such as channel connection control and hand-over control of wireless channels, while integrally controlling each unit. As a new function, a channel selection means 301*a* is provided wherein when transmission to the mobile terminal 1 is implemented, the importance information included in the IP header of the packet 31 is read in the protocol processing carried out by the transmission/reception data processor 303; the transport channels 26 according to the importance information are selected; and control information is transmitted to the base station system 2.

The frameclock synchronizer 304 is a device that decides transmission/reception timing between the base station controller 3, the base station system 2 and the mobile terminal 1. Each device possesses an independent counter; by checking each counter, the frameclock synchronizer 304 notifies the mobile terminal 1 of the timing in which messages are actually received, or instructs the base station system 2 of the transmission/reception timing, according to the counter value, when the channel is connected prior to the beginning of communication with the mobile terminal 1.

Figure 9:
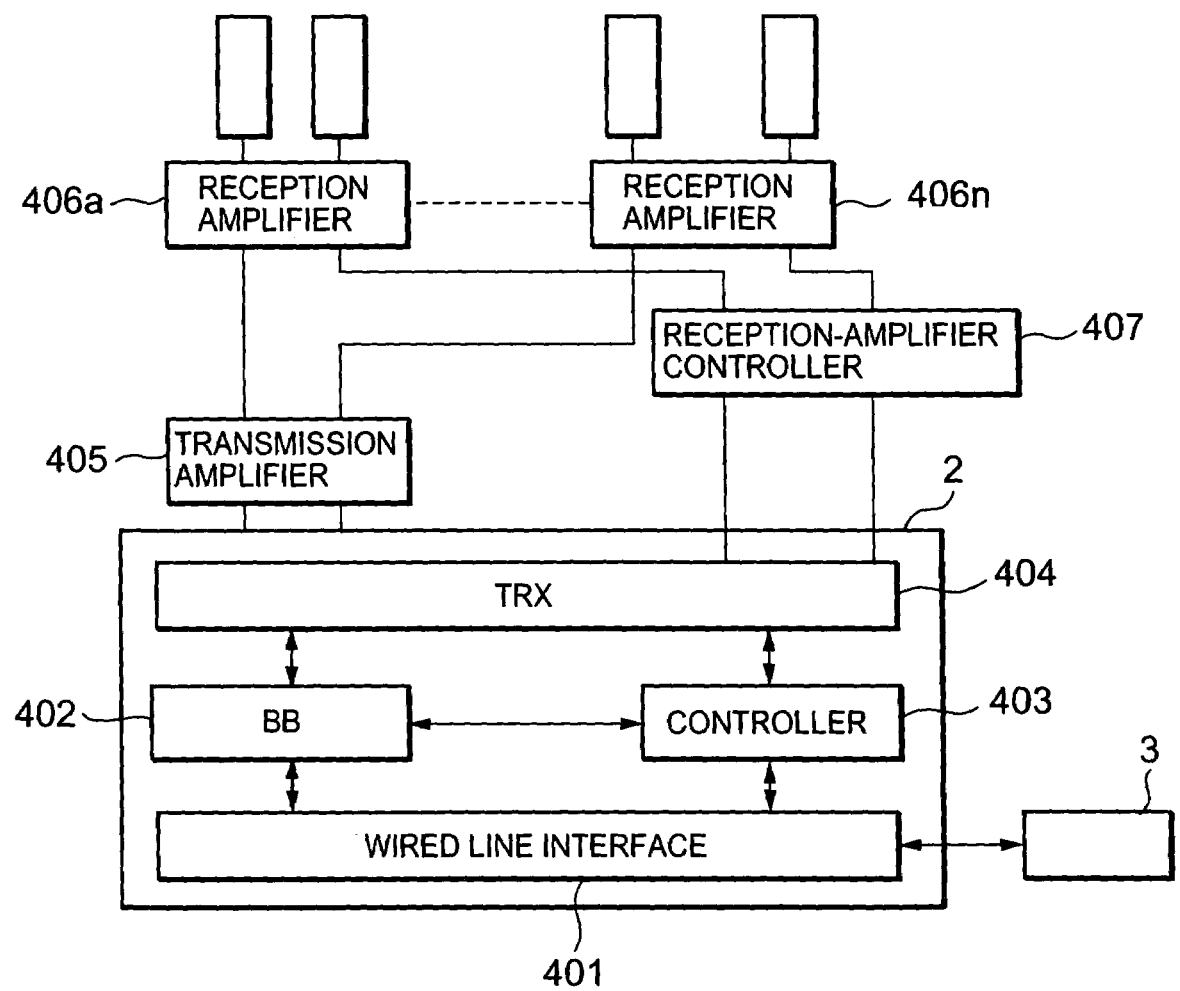
FIG. 9 is a view illustrating a system configuration of a base station system according to Embodiment 1.

FIG. 9 is a block diagram illustrating a configuration example for the base station system 2. The base station system 2 is made up of a wired line interface 401, a base band signal processor (BB) 402, a controller 403, a wireless unit (TRX) 404, a transmission amplifier 405, reception amplifiers 406*a* through 406*n*, a reception-amplifier controller 407, and an antenna 408.

In the base station system 2, when information for the packets 31 and the transport channels 26 through which the packets 31 are to be transmitted is received through the wired line interface 401 from the base station controller 3, the controller 403 controls the error correction coding and rate matching, which the base band signal processor 402 carries out, according to the required quality of the transport channels 26, and also implements wireless-transmission framing and spread modulation; the wireless unit 404 applies D/A conversion to the packets 31 and converts them into wireless-frequency signals by means of quadrature modulation; and transmission control is implemented so that the packets 31 are transmitted to the mobile terminal 1 after being power-amplified by the transmission amplifier 405 to a predetermined antenna input level.

In contrast, when wireless signals are received from the mobile terminal 1, the reception amplifier, e.g., 406*a*, amplifies them; the base band signal processor 402 implements reverse spread processing, error correction decoding, separation of multiplexed data, and the like; and the packets 31 are transmitted to the base station controller 3 through the wired line interface 401.

In order to enable the actual reception quality to satisfy the required quality of the transport channels 26, error correction coding and rate matching are carried out as discussed hereinafter.

Figure 10:
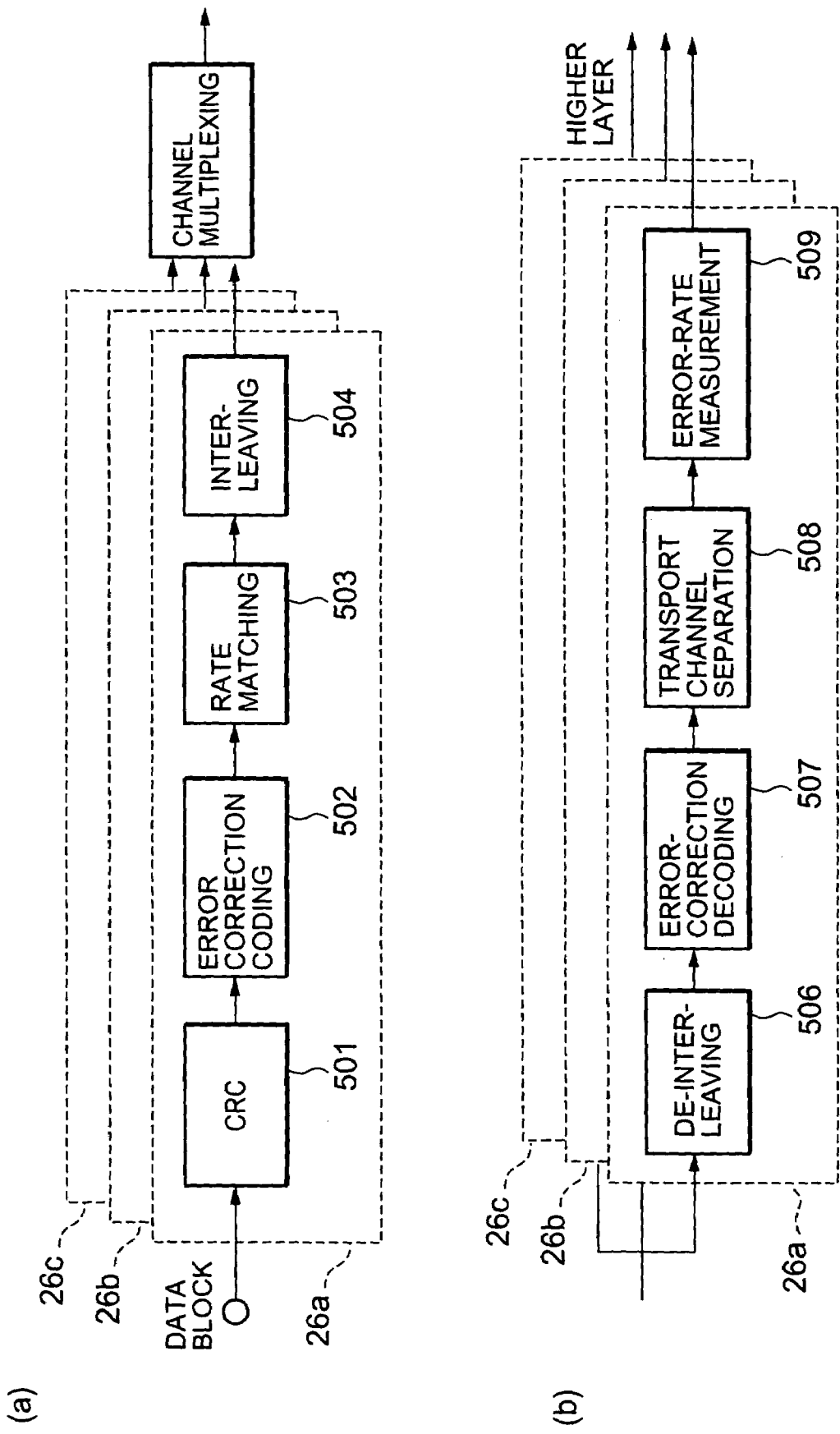
FIG. 10 is a view illustrating a configuration of transmitting/receiving operations according to Embodiment 1.

FIG. 10 is a block diagram illustrating steps for multiplexing transport channels in a physical channel.

FIG. 10(*a*) is a view illustrating the steps in transmission and FIG. 10(*b*), the steps upon reception.

In the first place, in FIG. 10(*a*), CRC (Cyclic Redundancy Check) codes are added in a CRC-code addition block 501 to the packets 31 from higher layers in order to detect errors, in the physical layer 100*a*, on the basis of the data block of the transport channels 26; then, are error-correction coded at optimal strength in an error correction coding block 502, comparing the required quality of the transport channels 26 with the reception quality. In addition, the rate matching is implemented in a rate matching block 503, also according to the quality of the transport channels 26; interleaving (rearranging the order of data to prevent errors from concentrating in a single portion of the data) is implemented in an interleaving block 504; and the multiplexing of each transport channel 26 in the physical channel 27 is implemented in a channel multiplexing block 505.

In cases of reception, as illustrated in FIG. 10(*b*), received signals, which have been treated by means of reverse spread processing, measurement of signal-to-interference power ratio (referred to as SIR hereinafter), and the like, are de-interleaved in a de-interleaving block 506 to the original form; the decoding on the basis of the transport channel 26 is implemented in an error-correction decoding block 507; data determination is implemented; a series of transmission data is reproduced; the division of the series of reproduced data into each transport channel 26 and the detection of block error rate are implemented; and transmission to higher layers is implemented.

In order to satisfy the required quality of the transport channels 26, the error correction coding, the rate matching, and transmission power control by means of the SIR measurement are carried out. As discussed above, the required quality signifies a bit error rate upon reception that is required for each transport channel 26; it would be understood that lower bit error rates are required for the transport channels 26 whose required quality is high, but higher bit error rates may be acceptable for the transport channels 26 whose required quality is low.

In Embodiment 1, a plurality of transport channels 26 is multiplexed in a single physical channel 24 and provision is made for the reception quality to satisfy the required quality by means of the error correction coding system, rate matching, and SIR. The physical channel 24 is a wireless channel that has a specific bit rate; the number of bits included in a radio frame is constant. As described above, the data blocks (the foregoing packets with classes A, B, and C) of the respective transport channels 26 are multiplexed time-wise in the radio frame and then bits are allocated to the data blocks. For this purpose, the number of bits for the packets 31*a*, 31*b* and 31*c* with the aforementioned class A, B, and C, respectively is adjusted by means of the error correction coding processing and the rate matching so that, in regard to the transport channel 26 whose required quality is high, a relatively large number of bits are included in a radio frame but a relatively small number of bits are included in a radio frame in regard to the transport channel 26 whose required quality is low. In addition, the sum of the data-block bits of each transport channel 26, which is included in a single radio frame is made to be the same as the number of bits included in a single radio frame of the physical channel 24.

In the error correction coding block 502, in the case of call voice data, convolution coding is typically utilized. In that situation, when the reception quality of the data block of each transport channel 26 is compared with the required quality, if the reception quality is below the required quality, the error-correction-coding rate is set to be small (error-correction-coding rate=net transfer capacity/total transfer capacity (net and error-correction transfer capacity); because the smaller the rate is, the more the information for error correction increases, smaller-rate error correction coding is suitable for harsh reception circumstances such as reception by mobile terminals); but, if the reception quality satisfies the required quality, the error-correction-coding rate is kept as it is, or set to be larger.

Next, the rate matching is applied to the series of coded bits of transmission data that have been treated by the error correction coding, depending on the required quality of each of the transport channels 26, the data block of which are multiplexed in the physical channel 24. The rate matching denotes allocation of the bits to the data blocks of each transport channel, included in a single radio frame flexibly changing the data sizes of the data blocks of the transport channels 26 by periodically applying repeated insertion (repetition) or thinning out (puncture), of the bit series of the transmission data, to the error-correction-coded data blocks of the transport channels 26, which are multiplexed in a single radio frame of the physical channel 24.

By inserting or thinning out bits in this manner, the sum of the data-block bits of each transport channel 26 is adjusted so as to be the number of bits for a single radio frame of the physical channel 24.

In addition, the quality is changed by implementing the transmission power control, changing the SIR depending on the quality required by the transport channels 26.

The base station controller 3 monitors the reception quality of each transport channel 26 and controls the aforementioned parameters so as to satisfy the required quality; however, when the channel situation is so poor that the required quality cannot be satisfied even by means of error correction coding and rate matching, the channels may be disconnected due to the abnormal communication.

The way how to implement error correction coding and rate matching while comparing the quality required by each transport channel 26 with the reception quality may be set according to the specification of the system to be realized.

Embodiment 1 employs only one physical channel 24; a plurality of physical channels may be provided in one-on-one relationships with respective transport channels 26. In such cases, in the CDMA system, a plurality of users utilizes the same frequency band and the mobile terminal 1 is identified by the spread code; however, the bit error rates decrease in inverse proportion to transmission power due to the interference among the mobile terminals 1 because the spread codes are not perfectly perpendicular to each other. Accordingly, the transmission through the physical channel 24 corresponding to the transport channel 26 whose required quality is high, is carried out with higher transmission power, while the transmission through the physical channel 24 corresponding to the transport channel 26 whose required quality is low, is carried out with relatively lower transmission power. With regard to the transmission power control, SIR values are measured upon reception and the transmission power is controlled in such a manner that the measured SIR values satisfy target SIR values set for the respective transport channels.

The reception quality of each packet is controlled so as to satisfy the required quality of each transport channel 26, utilizing in combination or separately these parameters in accordance with the system specification. It would be understood that parameters other than those discussed above may also be applied.

In Embodiment 1, the case was discussed in which high-importance data are securely transmitted by classifying the packets depending on the importance of the data, even though the data are in the same category; it should be understood that the importance may also be decided by means of control information and data.

For example, with regard to packets storing RTP and to ones storing RTCP—these packets are employed in the VoIP system, because the latter have higher priority, the port numbers of the latter may be used to decide the priority. The port number denotes a parameter of the UDP header and a number that is used to decide which data are conveyed to which program within a single terminal. The program in this situation denotes a number indicating RTP and RTCP. Even numbers must be used for RTP ports, and port numbers that are one unit bigger than those of RTP are used for RTCP. Using these port numbers as the importance information, the RTCP packets of high importance may be transmitted through the channels in which high quality is required.

Figure 11:
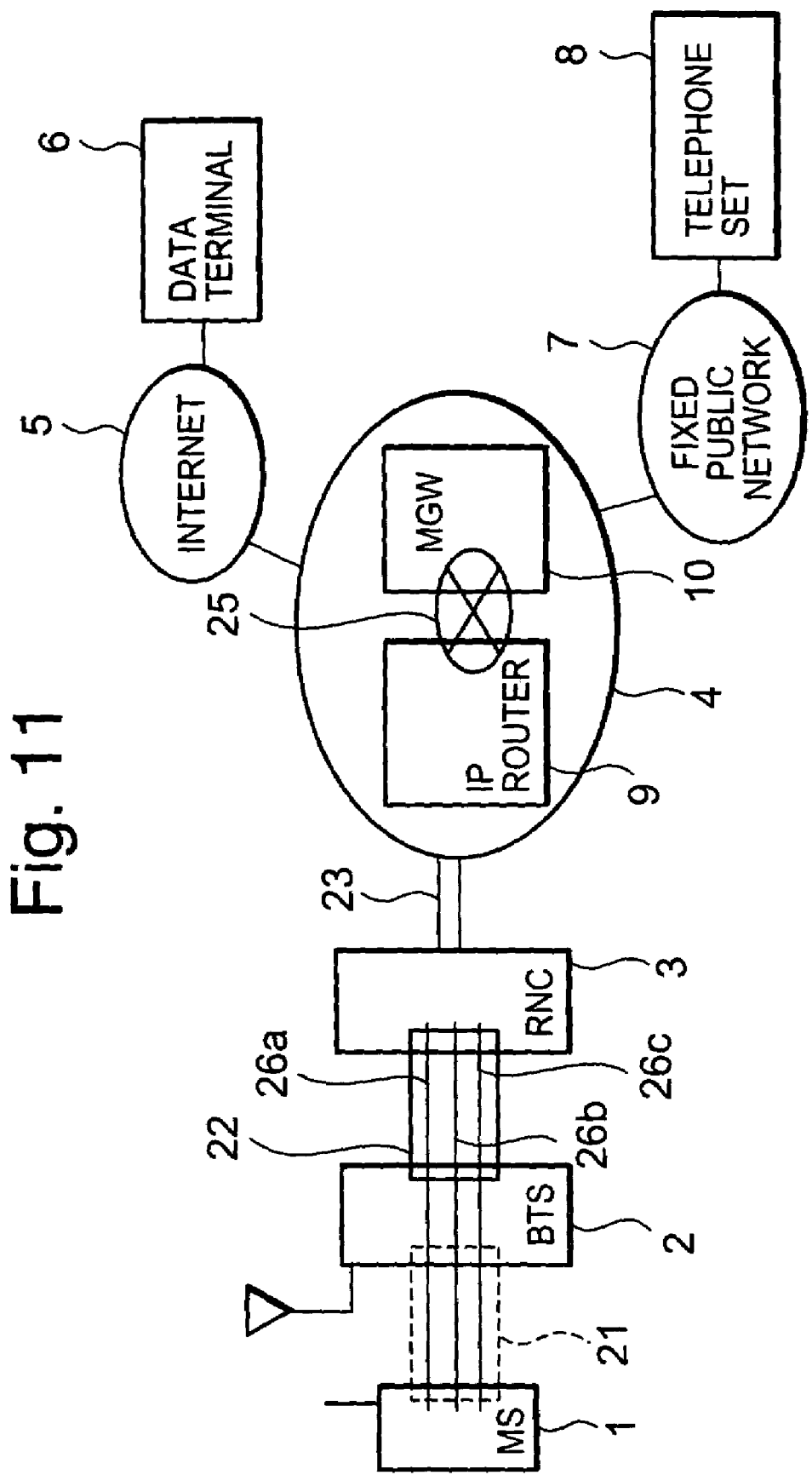
FIG. 11 is an example of a configuration of the mobile communication system according to Embodiment 1.

Moreover, as illustrated in FIG. 11, the mobile communication system may be configured in such a manner that the giving/receiving of data with a data terminal 6 is implemented through the Internet 5.

Embodiment 1 of the present invention is applicable also to data other than call voices if packets can be formed through classifying data by means of the unequal error protection or the like, depending on the importance of the data contents.

Figure 12:
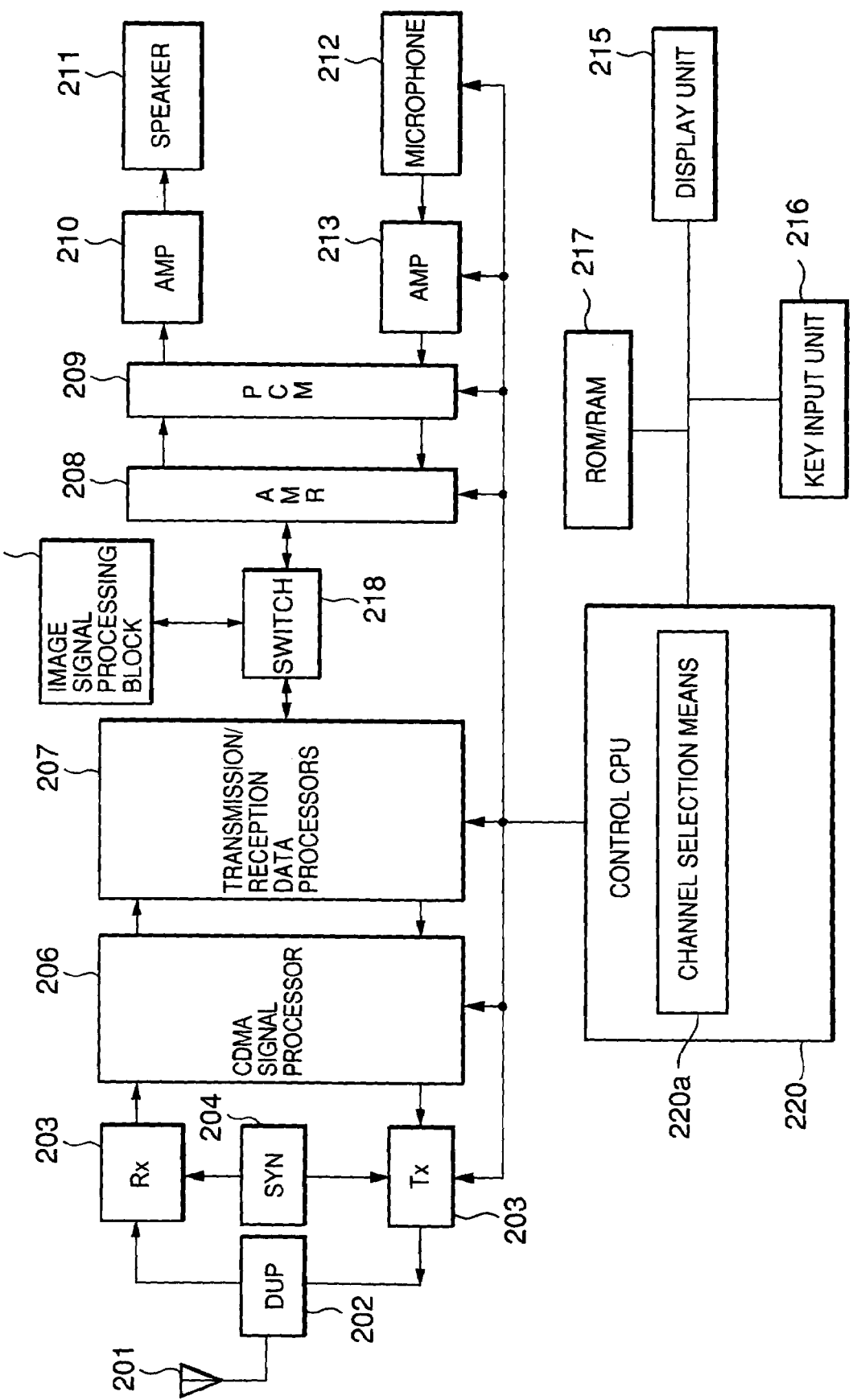
FIG. 12 is an example of a system configuration of the mobile terminal 1 according to Embodiment 1.

For instance, as a system configuration of the mobile terminal 1, illustrated in FIG. 12, the mobile terminal system may be configured in such a manner that with an image signal processing block 214 and a switch 218 being provided, a call-voice-data processing block and an image signal processing block are implemented with a single system, and the transmission quality is selected for each of the packets that are formed by means of classification according to the importance of the data contents.

As discussed above, according to Embodiment 1, by classifying the packets depending on the importance of the data, even among the same types of data, and by securely transmitting the packets having data of high importance to reception terminals through the transport channels whose required quality is high, a mobile communication terminal having high efficiency and high voice quality can be realized.

Embodiment 2.

Embodiment 2 according to the present invention will be discussed below. In Embodiment 1 set forth above, a mobile communication system is described wherein packets, which are formed by means of the classification for the unequal error protection implemented in AMR system coding, are transmitted through a plurality of transport channels; however, in Embodiment 2, a single packet is divided into a plurality of packet segments, and then the same identification number is added to each packet segment so as to re-synthesize the packet segments into the single packet; by transmitting important packet segments such as header information through the transport channels whose required quality is high, and packet segments of payloads that may accept low quality, through transport channels whose required quality is low, and then by re-synthesizing at reception sides the packet segments into a single packet, a mobile communication system is of high reliability, and the wireless resources are effectively utilized because segments that may accept low quality are not transmitted through transport channels whose required quality is high.

The system configuration and the arrangement of each device for Embodiment 2 are the same as those in FIG. 1 of Embodiment 1 set forth above, with exception that in protocol processing in the PDCP layer 103, which is implemented in the transmission/reception data processors of the mobile terminal 1 and the base station controller 3, a single packet is divided into headers and payloads in the case of transmission, and the divided packets are re-synthesized in the case of reception.

Figure 13:
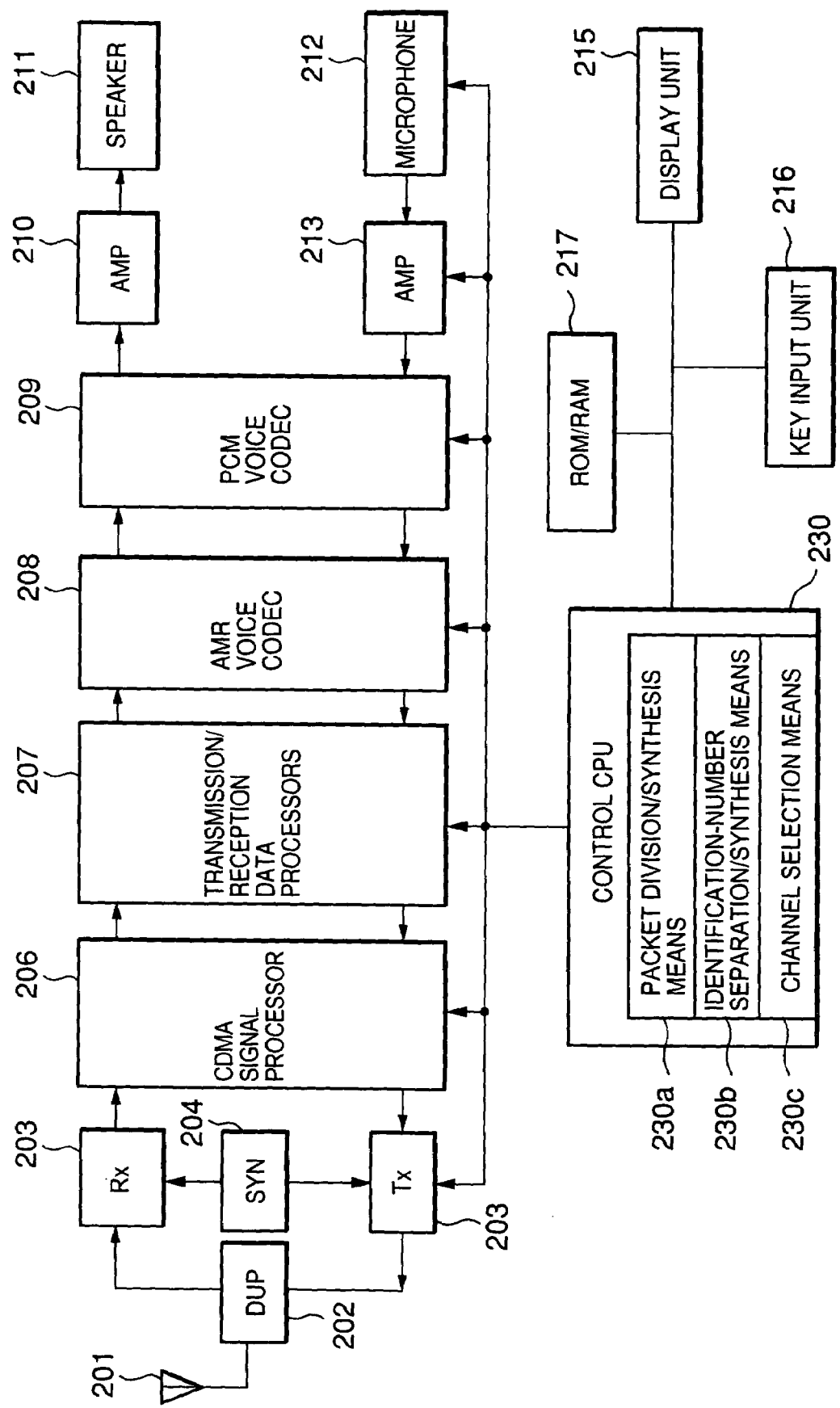
FIG. 13 is a view illustrating a system configuration of a mobile terminal according to Embodiment 2.

FIG. 13 is a view illustrating an example for the system configuration of the mobile terminal 1 according to Embodiment 2. The same constituent elements as those in Embodiment 1 are indicated by the same reference marks and explanations therefor will be omitted. In FIG. 13, the control CPU 230 possesses as new constituent elements a packet division/synthesis means 230a and an identification-number separation/synthesis means 230b, and the transmission/reception data processor 207b is controlled by these means.

Figure 14:
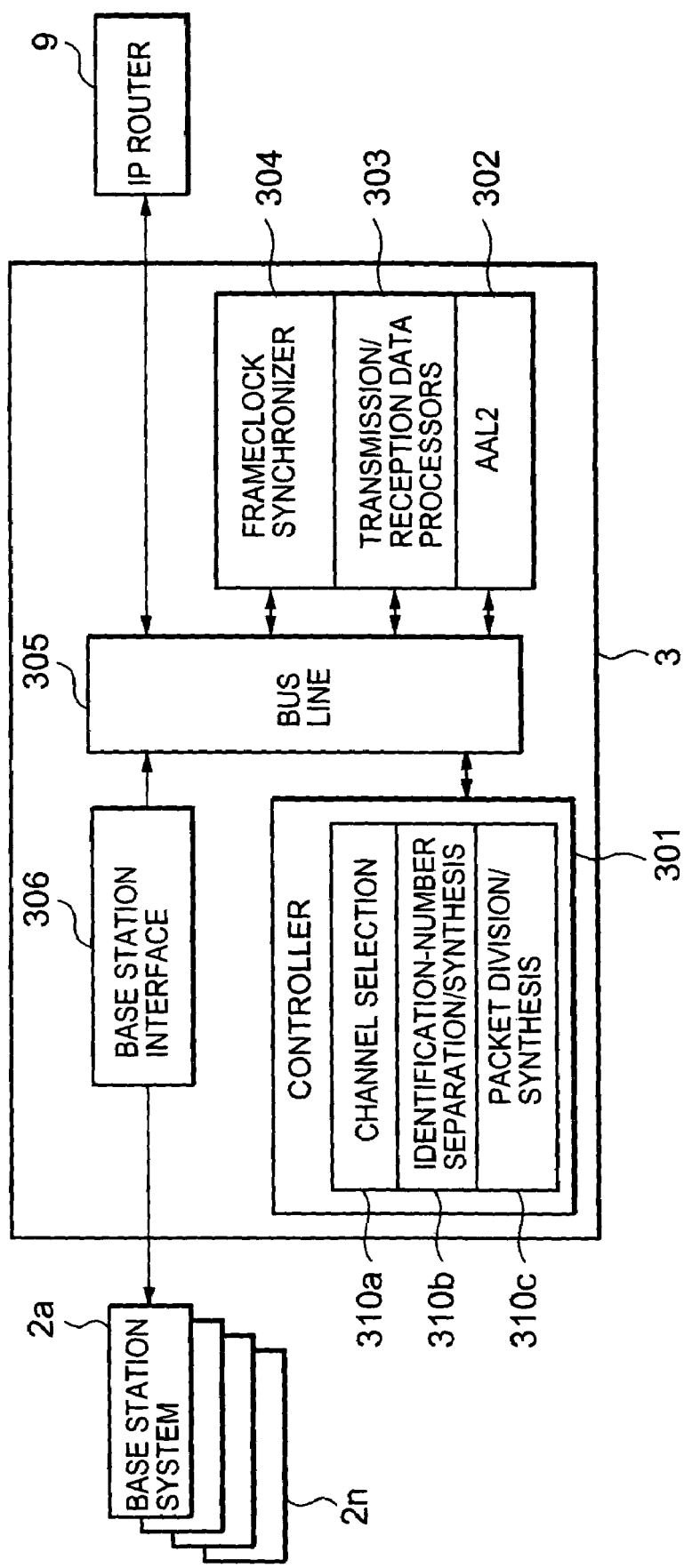
FIG. 14 is a view illustrating a system configuration of a base-station control system according to Embodiment 2.

FIG. 14 is a view illustrating an example for the system configuration of the base station controller 3 according to Embodiment 2. The same constituent elements as those in Embodiment 1 are indicated by the same reference marks and explanations for them will be omitted. In FIG. 14, the controller 310 possesses as new constituent elements a packet division/synthesis means 310a, an identification-number separation/synthesis means 310b and a channel selection means 310c, and the transmission/reception data processor 303 is controlled by these means.

The operation of the mobile communication system will be now discussed. In the first place, it is assumed that the quality of the transport channels 26 is controlled by the parameters discussed in Embodiment 1, and the required quality of the transport channels 26a, 26b and 26c is higher in that order.

In cases where voice data are transmitted from the telephone set 8 to the mobile terminal 1, the operation of the mobile communication system is the same as that of Embodiment 1, wherein voice data are coded to PCM-coded data; the voice data are converted in the media gateway 10 from the PCM-coded data into AMR-coded data, and then are transmitted by way of the IP router 9 to the base station controller 3. In this situation, an RTP and an RTCP packet transmitted by way of the IP router 9 each has the packet configuration illustrated in FIG. 15(a) or FIG. 16(b).

Figure 15:
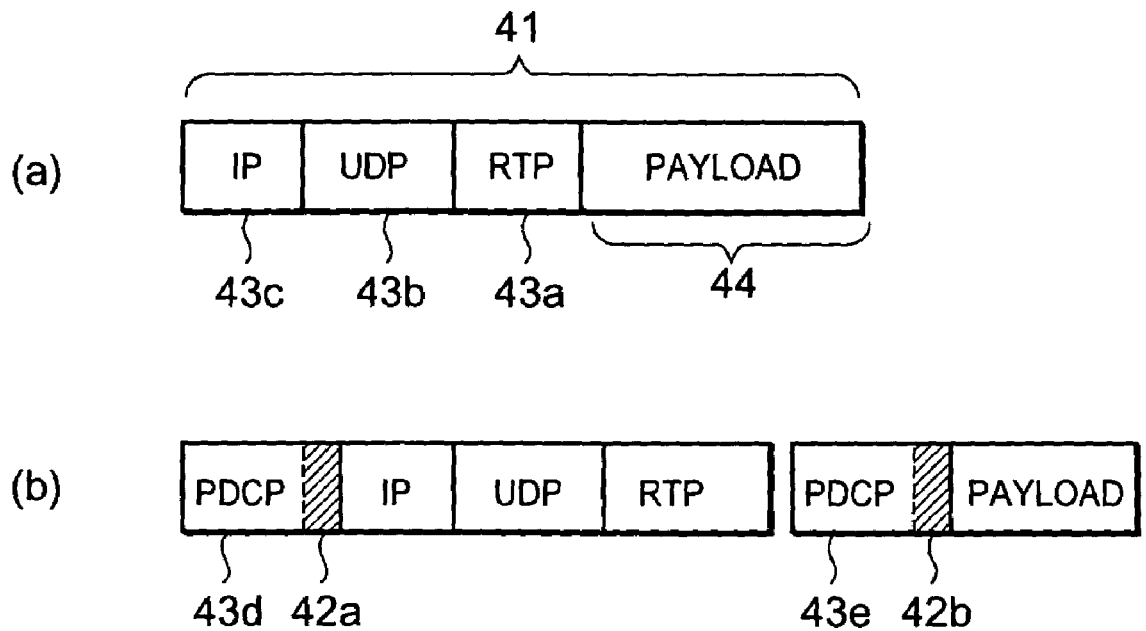
FIG. 15 is a view illustrating frame structures of RTP packets according to Embodiment 2.

FIG. 15 is a view illustrating packet configurations according to Embodiment 2. FIG. 15(a) illustrates a packet that is at the step where an IP header is added thereto by means of protocol processing in the IP layer 104; FIG. 15(b) illustrates a packet in the PDCP layer 103.

Figure 16:
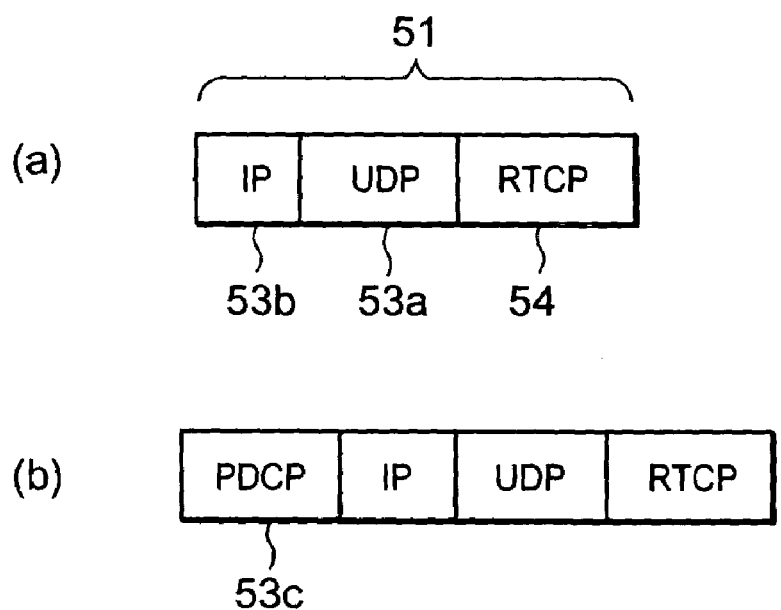
FIG. 16 is a view illustrating frame structures of RTCP packets according to Embodiment 2.

In addition, FIG. 16 is a view illustrating configurations of RTCP packets according to Embodiment 2; FIG. 16(a) and (b) each illustrates in that order a packet configuration in the IP layer 104 and in the PDCP layer 103.

In FIG. 15, at 41 is a packet including a header 43 and a payload 44; at 42a and 42b are identification numbers that are added in the PDCP layer and consist of the same numerals. The header 43 includes, in FIG. 15(a), an RTP header 43a, a UDP header 43b and an IP header 43c; in addition, in FIG. 15(b), PDCP headers 43d and 43e are added.

In FIG. 16, at 51 is a RTCP packet. In FIG. 16(a), the RTCP packet possesses an RTCP message 54 in the payload, and the header includes a UDP header 53a and an IP header 53b; in addition, in FIG. 15(b), a PDCP header 53c is added.

When the packet 41 illustrated in FIG. 15(a) is transmitted to the base station controller 3, before the packet is transmitted by way of the bus lines 305 in FIG. 14 to the base station system 2, the protocol processing in the PDCP layer 103b, which is implemented in the transmission/reception data processor 303, in addition to conventional processing such as compression of the header 43, determines whether the packet is RTP-type or RTCP-type by checking the header 43 of the RTP packet 41 and the header 53 of the RTCP packet 51 in order to judge whether or not the division of the packet is necessary and the quality that is required in the transport channels 26a, 26b and 26c to be utilized for transmission. For instance, as discussed in Embodiment 1, the identification may be implemented by port numbers that signify the RTP and RTCP included in the UDP headers 43b and 53a.

In regard to the RTP packet 41, when errors are produced in the header 43, there occur problems, e.g., wherein normal transmission is not implemented; however, in regard to the payload 44 that stores voice data, only the voice quality is partially deteriorated even though errors exist in a part of the payload.

In contrast, in regard to the RTCP packet 51, because the RTCP message 54, which is a payload, also stores control information, the occurrence of errors in the packet constitutes an obstacle to the transmission.

In order to address this, in accordance with the difference in bit error rates permitted to the respective packets, i.e., the required quality, as represented in FIG. 15(b), the RTP packet is divided into the header 43 and the payload 44 that are mapped as independent packets in the RLC layer 102. This operation is implemented by the packet division/synthesis means 310a in the controller 310 of the base station controller 3 illustrated in FIG. 14.

In this situation, the same identification number 42a or 42b is added to a predetermined position within each of the PDCP headers 43d and 43e so that the divided packets can be re-synthesized in the PDCP layer 103 at the reception side; this operation is implemented by the identification-number separation/synthesis means 310b in the controller 310.

The header 43 and the payload 44 of the RTP packet, which the respective identification numbers 42a and 42b are added to, are distributed, by way of the RLC layer 102b and the MAC layer 101b, to transport channels 26 according to the transmission quality; this operation is implemented by the channel selection means 310c in the controller 310. As Embodiment 1, in Embodiment 2, the RLC layer 102 does not carry out the retransmission control, and with the logic channels 27 being in a one-on-one relationship with the transport channels 26, the MAC layer 101 does not carry out multiplexing or separating of channels; thus, both layers directly convey the packets to adjacent layers without adding headers or the like.

In the layers lower than the MAC layer 101b of the base station controller 3, wireless-transmission-timing information to implement transmission from the base station system 2 to the mobile terminal 1, control information such as error correction coding, rate matching and transmission power control, according to the required quality and the channel situation of the transport channels 26, are added in the FP layer 110b, and the packet segments are transmitted by means of ATM to the base station system 2.

The operation of the base station system 2 upon transmission/reception is the same as that discussed in Embodiment 1: respective packet segments are inputted to the base band signal processor 402 by way of the wired line interface 401; the controller 403 implements error correction coding and rate matching according to the required quality and channel situation of the transport channels 26; the wireless unit 404 and the transmission amplifier 405 implement quadrature modulation and amplification, respectively; and then, transmission to the mobile terminal 1 is implemented according to instructions for wireless-transmission-timing from the base station controller 3.

In the processes where the divided header 43 and payload of the RTP packet are transmitted to the mobile terminal 1 and voices are reproduced, the processing by each device or layer is the same as that in Embodiment 1 discussed above, with exception that the divided header 43 and payload 44 are re-synthesized by identifying the identification numbers 42a and 42b, in protocol processing in the PDCP layer 103a, which is implemented in the transmission/reception data processor 207 by the packet division/synthesis means 230a, the identification-number separation/synthesis means 230b and the channel selection means 230c in the control CPU 230, and are conveyed to the IP layer 104a.

Discussing this based on FIG. 15, the packet 41 received through the physical layer 100a is conveyed to the PDCP layer 103a, without being particularly treated in the MAC layer 110a and the RLC layer 102a. In this situation, the header 43 and the payload 44 of the RTP packet are configured as illustrated in FIG. 15(b).

In the PDCP layer 103, when the identification number 45a is identified by checking the PDCP headers 43d and 43e, the packet segments sharing the same identification number are sought; respective PDCP headers 43d and 43e are eliminated; and then the header 43 and payload 44 are re-synthesized into the single RTP packet 41 as illustrated in FIG. 15(a) and are conveyed to the IP layer 104.

In addition, each processing is implemented sequentially in the IP layer 104, the UDP layer 105 and the RTP layer 106, and the packet 41 is conveyed to the upper layers with each header being eliminated; the packet 41 is inputted by way of the switch 218 to the voice code processor 208 and decoded by means of AMR system to reproduce voices.

Unlike the RTP packet 41, the RTCP packet 51 is not divided.

When the RTCP packet 51 is conveyed to the RTP layer 106 of the mobile terminal 1, the network quality is detected from information such as transfer delay, based on the RTCP message 54, and is utilized to control channels.

Moreover, the payload 44 of the RTP packet may be transmitted being further divided. The same identification numbers are added to the divided data so that the header 43 and the payload 44 can be associated with each other.

As discussed above, in Embodiment 2, when segments that differ in the required quality exist within a single IP packet, the packet is divided into the segments and transport channels are selected according to the required quality of the segments; therefore, a mobile communication system can be obtained, wherein the reliability is high, and wireless resources are effectively utilized because segments that may accept low quality are not transmitted through transport channels whose required quality is high.

Embodiment 3.

Embodiment 3 according to the present invention will be discussed below. In Embodiment 2 discussed above, a single packet is divided into a plurality of segments, and the same identification number is added to each segment to combine the divided segments; however, there has been a problem in that when payloads transmitted through transport channels whose required quality is low lose the identification numbers, the headers and payloads might not be re-synthesized. In Embodiment 3, the operation is the same as that of Embodiment 2, wherein a single packet is divided at least into header packet segments or payload packet segments; however, payload-reception-timing information, which is added only to the headers, is utilized as the information to combine the headers and payloads. In addition, because the headers with the payload-reception-timing information are transmitted through the transport channels whose required quality is high, the information such as the identification numbers as discussed in Embodiment 2, which produce problems when payloads transmitted under low quality suffer losses, is not included. Thanks to this, the headers and payloads can be combined without fault, which results in a mobile communication system having higher reliability.

Figure 17:
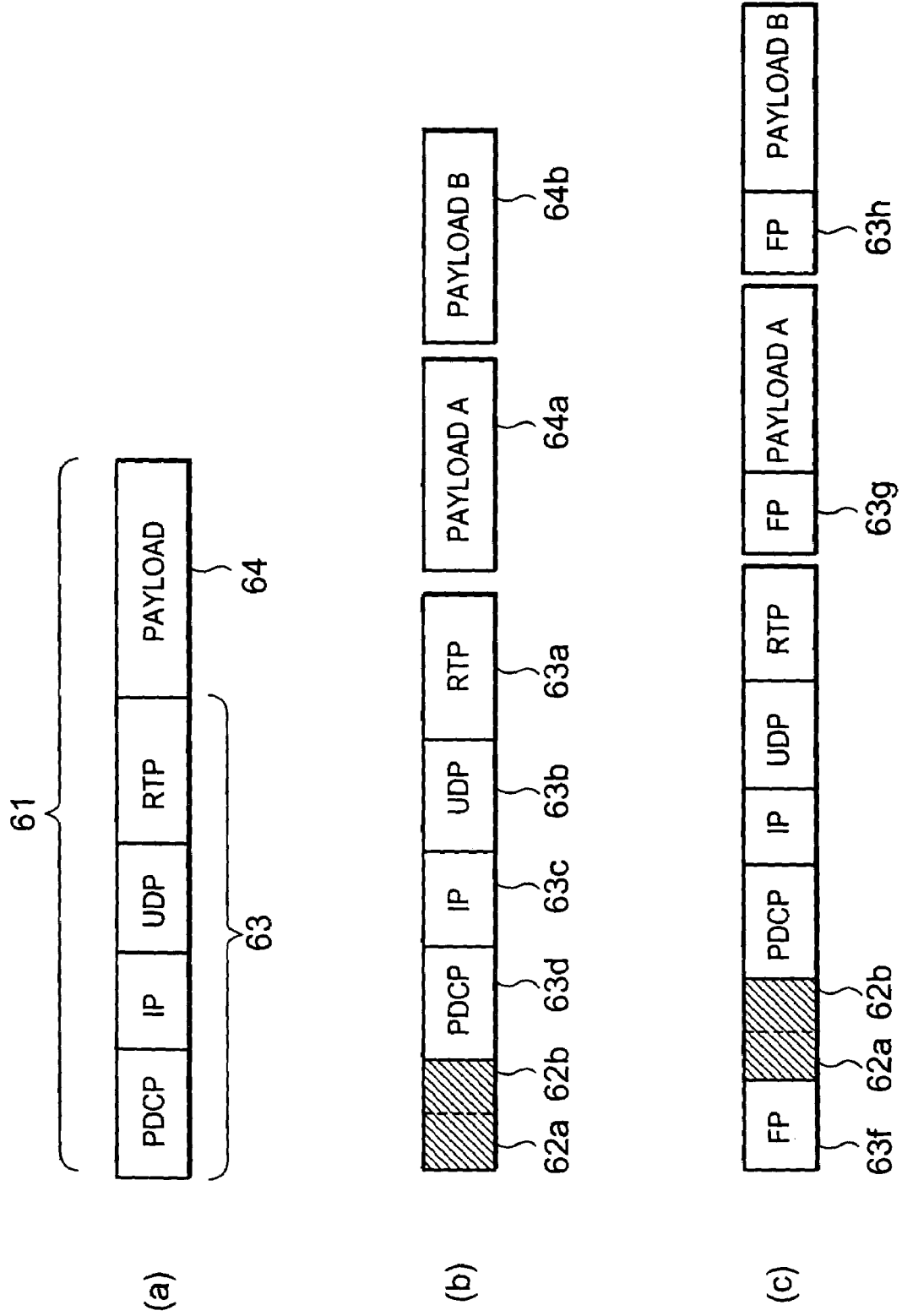
FIG. 17 is a view illustrating frame structures of packets according to Embodiment 3.

FIG. 17 is a view illustrating packet configurations according to Embodiment 3 of the present invention.

FIG. 17(a) is a view illustrating a packet configuration in the RLC layer 102 of the base station controller 3 according to Embodiment 3.

FIG. 17(b) is a view illustrating a packet configuration in the MAC layer 101b of the base station controller 3.

FIG. 17(c) is a view illustrating a packet configuration in the FP layer 101c of the base station controller 3.

In FIG. 17, at 61 a packet; at 62a and 62b, payload-reception-timing information that is added in the MAC layer 101 to a header 63; the payload-reception-timing information 62a is for the first half of a payload 64a; the payload-reception-timing information 62b is for the last half of the payload 64b; at 63f, 63g and 63h are FP headers that are added in the FP layer 110b of the base station controller 3 and each includes the wireless-transmission-timing information, which is reported to the base station system 2, of respective packet segments 63, 64a and 64b.

Figure 18:
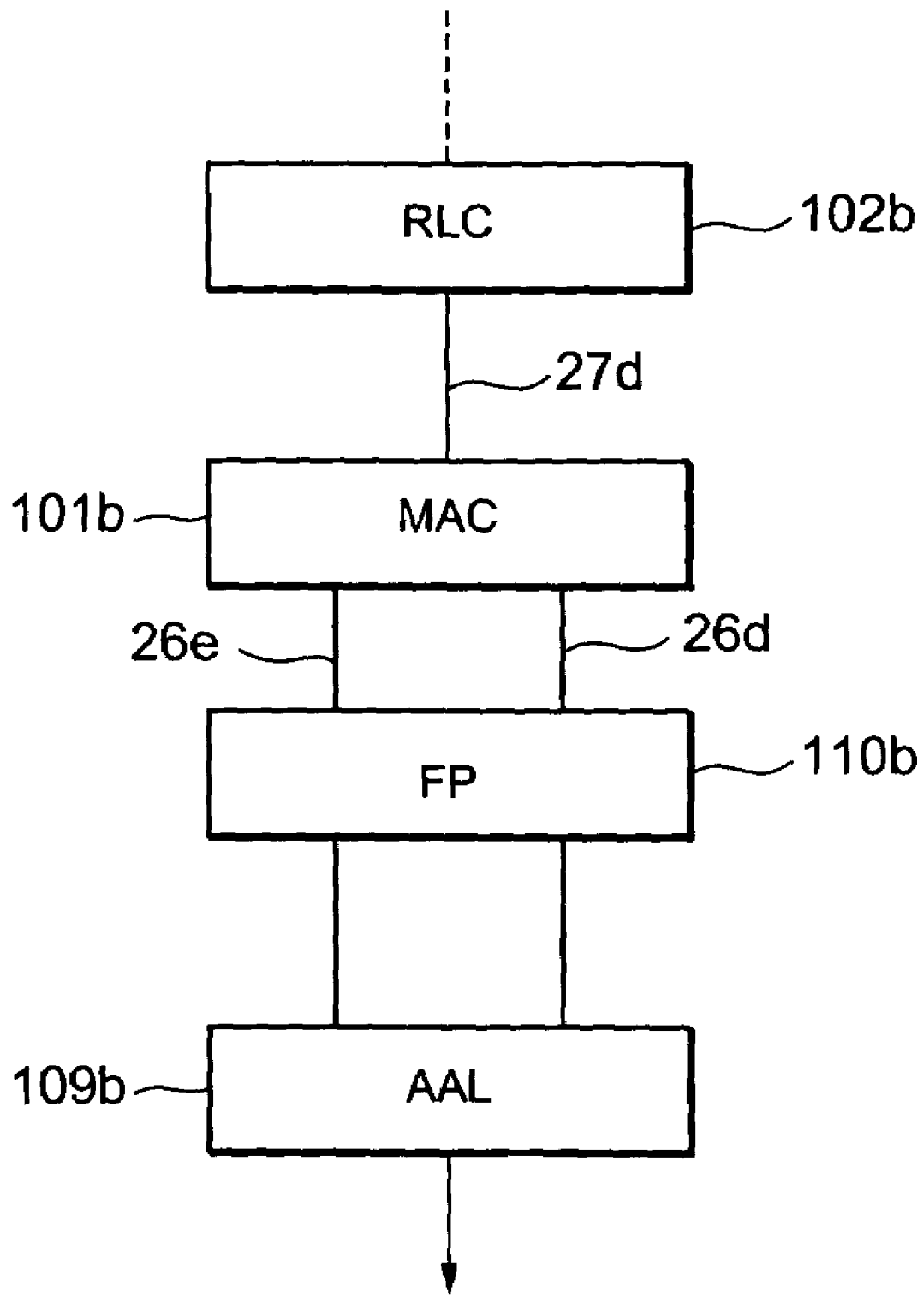
FIG. 18 is a view illustrating channel configurations between protocol layers according to Embodiment 3.

FIG. 18 is a view illustrating channel structure between respective layers in the base station controller 3 according to Embodiment 3. For the sake of brevity, the number of channels is simplified; in cases where a system is actually made up, setting up channels more than this number produces no problem. At 27d is a logical channel; at 26d, a transport channel whose required quality is high; at 26e, a transport channel whose require quality is low.

Figure 21:
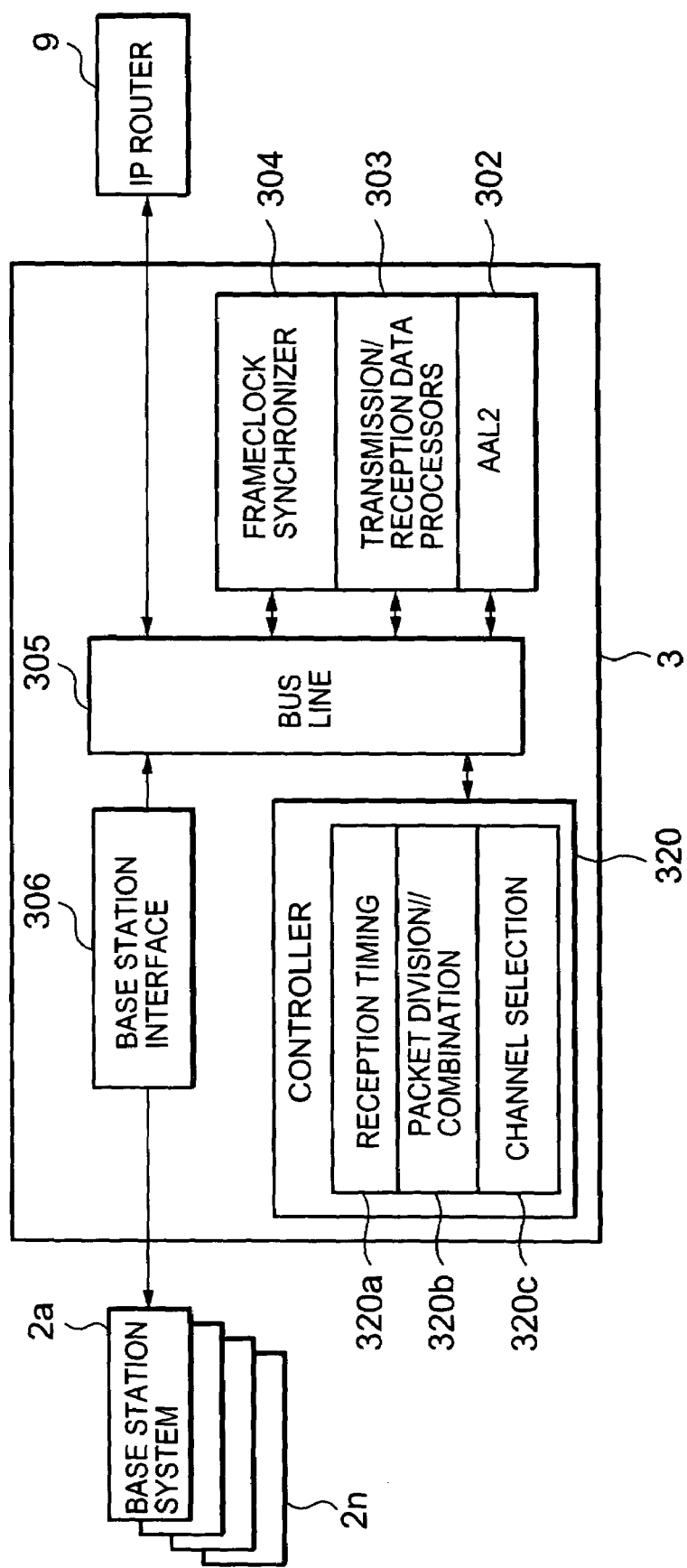
FIG. 21 is a view illustrating a system configuration of a base-station control system according to Embodiment 3.

Moreover, FIG. 21 illustrates an example for a system configuration of the base station controller 3. A controller 320 possesses as new constituent elements a packet division/synthesis means 320a, a payload-reception-timing information separation/combination means 320b and a channel selection means 320c.

The operation of the mobile communication system will be now discussed. The packet 61 transmitted from the IP router 9, with the header 63 being compressed in the PDCP layer 103b of the base station controller 3, and with the PDCP header 63d including a packet ID and the like being added, is conveyed by way of the RLC layer 102b to the MAC layer 101b. As illustrated in FIG. 17(a), the configuration of the packet 61 is not different from that in the PDCP layer 103b because retransmission control is not implemented in the RLC layer 102b.

In the MAC layer 101b, as illustrated in FIG. 17(b), the payload-reception-timing information 62a and 62b is added to the packet, which instruct that, in which timing within a radio frame the mobile terminal 1 receives the first half of a payload 64a and the last half of a payload 64b, and then the packet is divided into the header 63, the first half of a payload 64a and the last half of a payload 64b.

The payload-reception-timing information 62a and 62b is information that indicates relative reception timing of the payloads 64a and 64b, i.e., a time lag in the radio frame upon reception, to the header 63 and is utilized to recognize, in the MAC layer 101a of the mobile terminal 1 at the reception side, the order of the payloads 64a and 64b.

The packet 61 with the payload-reception-timing information 62a and 62b being added is divided into the header 63, the first half of a payload 64a and the last half of a payload 64b; as illustrated in FIG. 18, the header 63, through the transport channel 26d whose required quality is high, and the first half of a payload 64a and the last half of a payload 64b, through the transport channel 26e whose required quality is low, are conveyed to the FP layer 10b.

In the FP layer 110b, as illustrated in FIG. 17(c), each packet segment, with the FP header 63f, 63g or 63h that includes the timing of its own within the radio frame being added, is conveyed to the AAL layer 109b and is conveyed by way of the cable channel 22 to the base station system 2 after being each re-synthesized to an ATM cell.

In the base station system 2, the ATM cell is rearranged in the AAL2 layer 109a into respective packet segments having the configuration illustrated in FIG. 17(c); in the FP layer 110a, each packet segment is made to have a configuration illustrated in FIG. 17(b) by reading and then eliminating the respective FP headers 63f, 63g and 63h including timing of each packet segment within the wireless transmission frame; and then, each packet segment is transmitted to the mobile terminal 1 according to the transmission timing included in the respective FP headers 63f, 63g and 63h.

Figure 19:
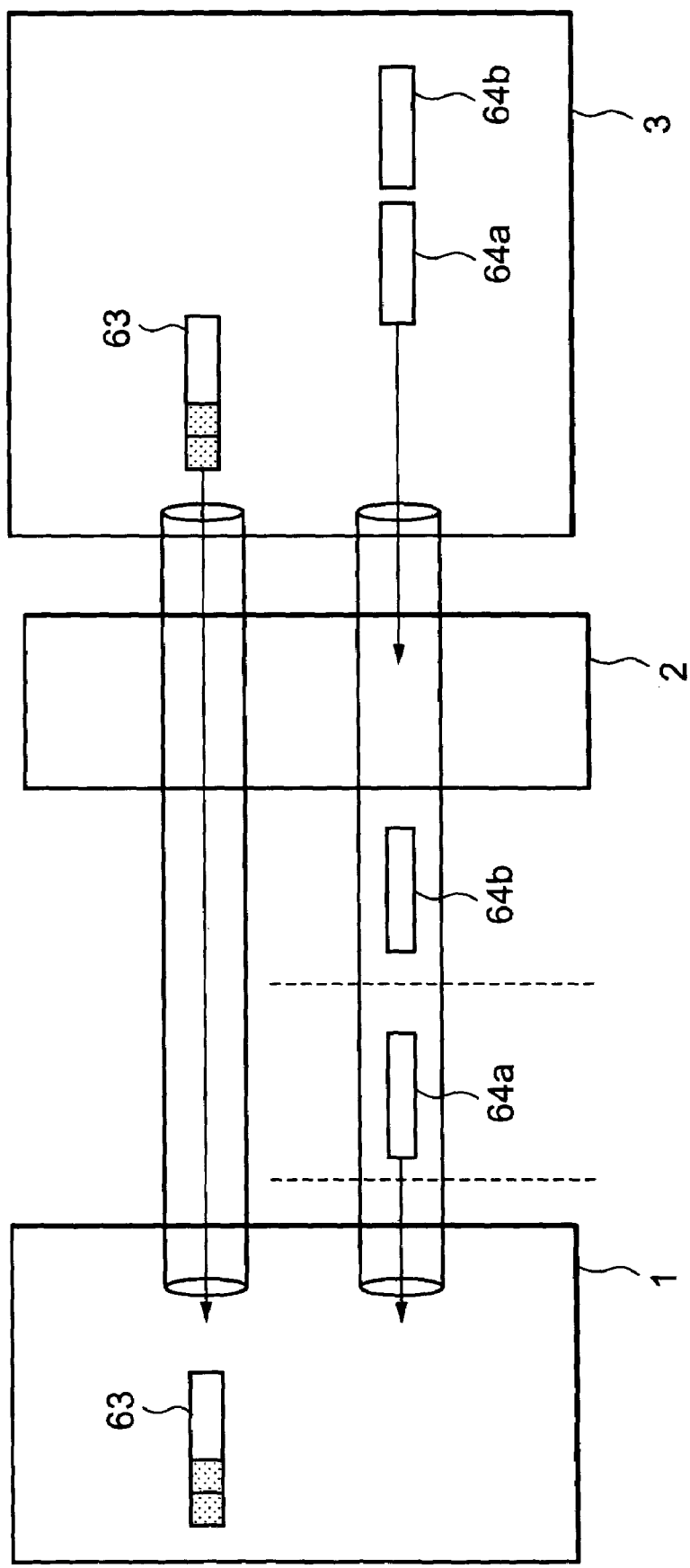
FIG. 19 is a view illustrating transmission timing of each packet segment according to Embodiment 3.

FIG. 19 is a view illustrating transmission timing of a packet according to Embodiment 3. The header 63 having the payload-reception-timing information 62a and 62b is transmitted to the mobile terminal 1.

Figure 20:
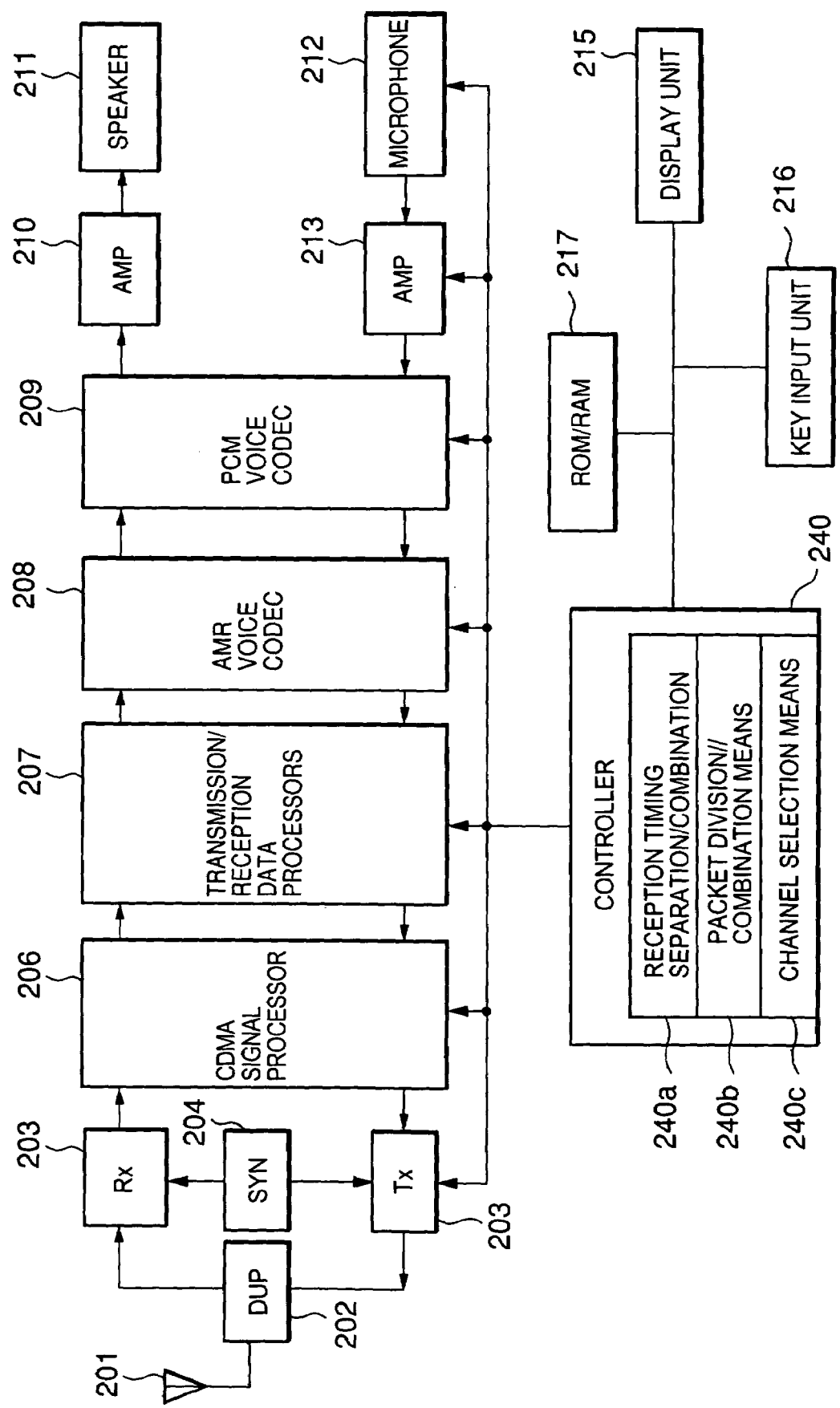
FIG. 20 is a view illustrating a system configuration of a mobile terminal 1 according to Embodiment 3.

In the mobile terminal 1, as represented in FIG. 20, when the header 63 is transmitted thereto, after signal processing in the reception circuit 203 and the CDMA signal processor 206, the packet segment transmitted is identified from the quality of the transport channel 26d as the header 63; in the protocol processing in the MAC layer 101a of the transmission/reception data processor 207, the timing in which the first half of a payload 64a and the last half of a payload 64b are transmitted is recognized by checking the payload-reception-timing information 62a and 62b; and the payload-reception-timing information 62a and 62b are eliminated.

Thereafter, when the first half of a payload 64a and the last half of a payload 64b sequentially transmitted from the base station system 2 are received by the mobile terminal 1, they are identified from the reception timing as the first half of a payload 64a and the last half of a payload 64b; and they are re-synthesized into the packet 61 as illustrated in FIG. 17(a) and are conveyed to the upper layers by way of the transport channel 27d.

Thereafter, voices are reproduced through the same processing as that in Embodiment 2 described above.

When the length of the payload is longer than that discussed above, it is coped with by increasing the number of division to more than two. In this situation, it is understood that the payload-reception-timing information of each divided payload is added to the header 63 according to the number of division of the payload.

In contrast, when transmission is implemented from the mobile terminal 1, voices inputted through the microphone 212 is coded by means of AMR coding in the voice code processor 209; by applying the protocol processing of RTP through PDCP to the payload 64 inputted by way of the switch 218 to the transmission/reception data processor 207, the packet as illustrated in FIG. 17(a) is formed; and then, in the MAC layer 101a, the wireless-reception-timing information 62a and 62b is added to the header 63; the packet is divided to form respective packet segments illustrated in FIG. 17(b); each packet segment is conveyed to the physical layer 100a, by selecting the transport channel 26 having quality corresponding to each packet segment.

The operation of the physical layer 100a, i.e., the transmission operation after the CDMA signal processor 206 is the same as that of Embodiment 2 described above.

In the FP layer 110a of the base station system 2 at the reception side, as illustrated in FIG. 17(c), with the timing in which the packet segments have been received in the base station system 2 being added to the FP headers 63f, 63g and 63h, the respective packet segments are transmitted by means of ATM to the base station controller 3.

In the base station controller 3, the configuration of each packet segment as illustrated in FIG. 17(c) is restored in the AA layer 109b from the ATM cell; in the FP layer 10b, the reception-timing information included in the FP headers 63f, 63g and 63h is reported to the MAC layer 101b; in the MAC layer 101b, by comparing the payload-reception-timing information 62a and 62b as illustrated in FIG. 17(b) with the actually received timing reported from the FP layer 10b, the packet segments that are received in the coincident timing are identified as the first half of a payload 64a and the last half of a payload 64b, and are conveyed to the upper layers after being synthesized to the single packet 61 as illustrated in FIG. 17(a).

Thereafter, voices are reproduced through the same processing as that in Embodiment 2 described above.

Moreover, in FIG. 19, the payloads 64a and 64b are transmitted behind the header 63; however, because the transport channels through which the header 63 and payloads 64a and 64b are transferred have been reported by the base station controller 3 to the mobile terminal, the header 63 does not necessarily need to be transmitted firstly; for instance, the setting may be implemented in such a manner that the header 63 and the payload 64a are simultaneously transmitted and the transmission of the payload 64b follows the transmission of the header 63 and the payload 64a one frame later.

As discussed above, according to Embodiment 3, a single packet is divided into headers and payloads, and the headers with payload-reception-timing information of the payloads being added are transmitted through the transport channels whose required quality is high, while the payloads are transmitted through the transport channels whose required quality is low; accordingly, because the information for re-synthesis is not added to the packet segments that are transmitted through the transport channels whose required quality is low, a mobile communication system having higher reliability is obtained.

Embodiment 4.

Embodiment 4 according to the present invention will be discussed below. Embodiment 4 is employed in cases where packets with payloads having a fixed length, such as those that have output from a voice code processor, in their payloads, are transmitted. When channel connection is implemented prior to a call between a mobile terminal and a base station system, the preliminary notification of the payload-reception-timing information eliminates the necessity of addition of reception-timing information to each packet; therefore, because segmented packets can be re-synthesized into a single packet, higher reliability is ensured. Embodiment 4 is applied in cases where the payloads have a fixed length; because the number of division of the payload is fixed, the payload-reception-timing information may be reported only once when the transmission is initiated. Embodiment 3 discussed above is applied in cases where payloads are variable in length; because the number of division of the payload is variable, the payload-reception-timing information needs to be reported upon each transmission.

Figure 22:
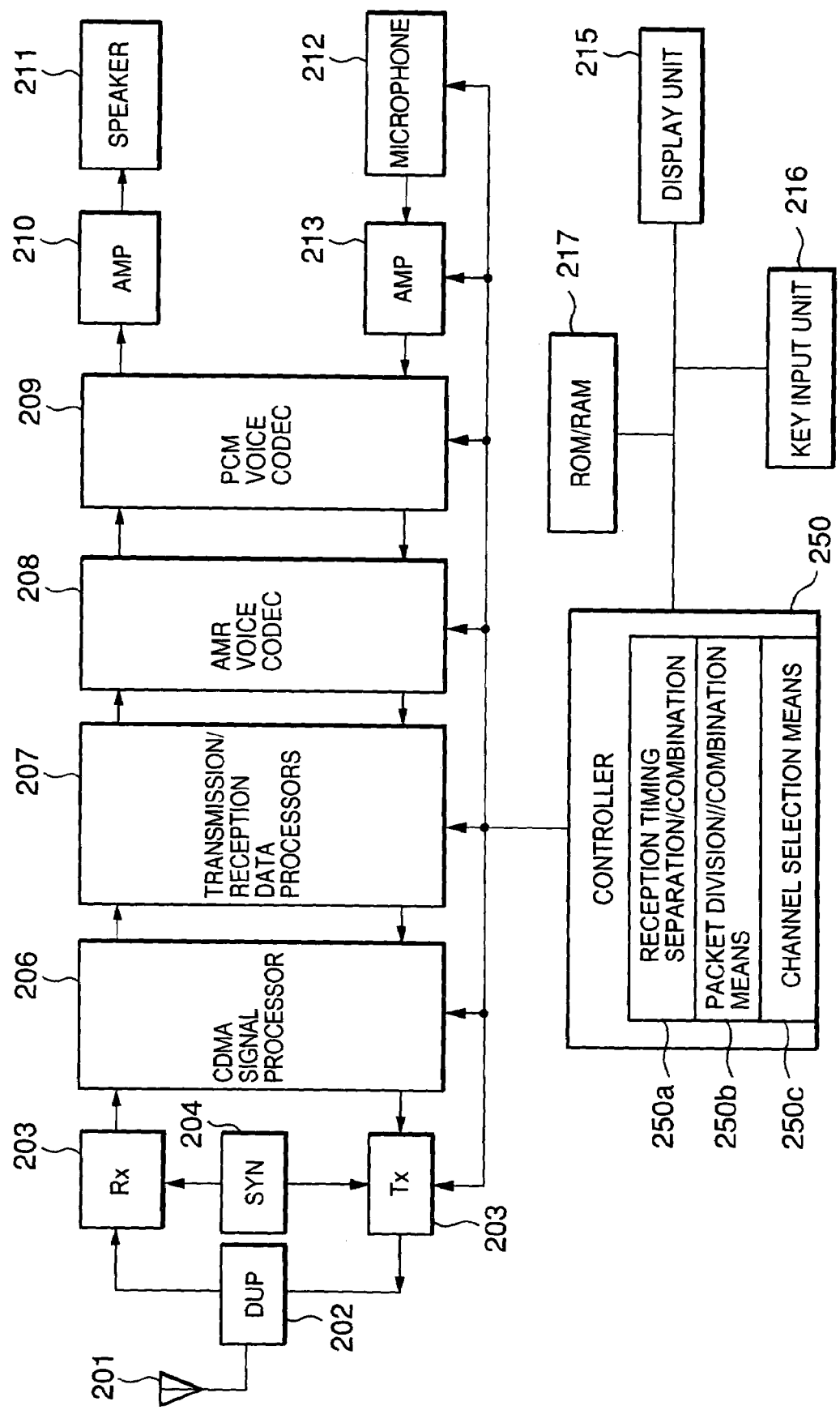
FIG. 22 is a view illustrating a system configuration of a mobile terminal 1 according to Embodiment 4.

The operation of the mobile communication system will be now discussed. FIG. 22 is a system configuration of the mobile terminal 1 according to Embodiment 4 of the present invention. As a new function, the control CPU includes a payload-transmission-timing setting means 250a, a packet division/combination means 250b and a channel selection means 250c.

Figure 23:
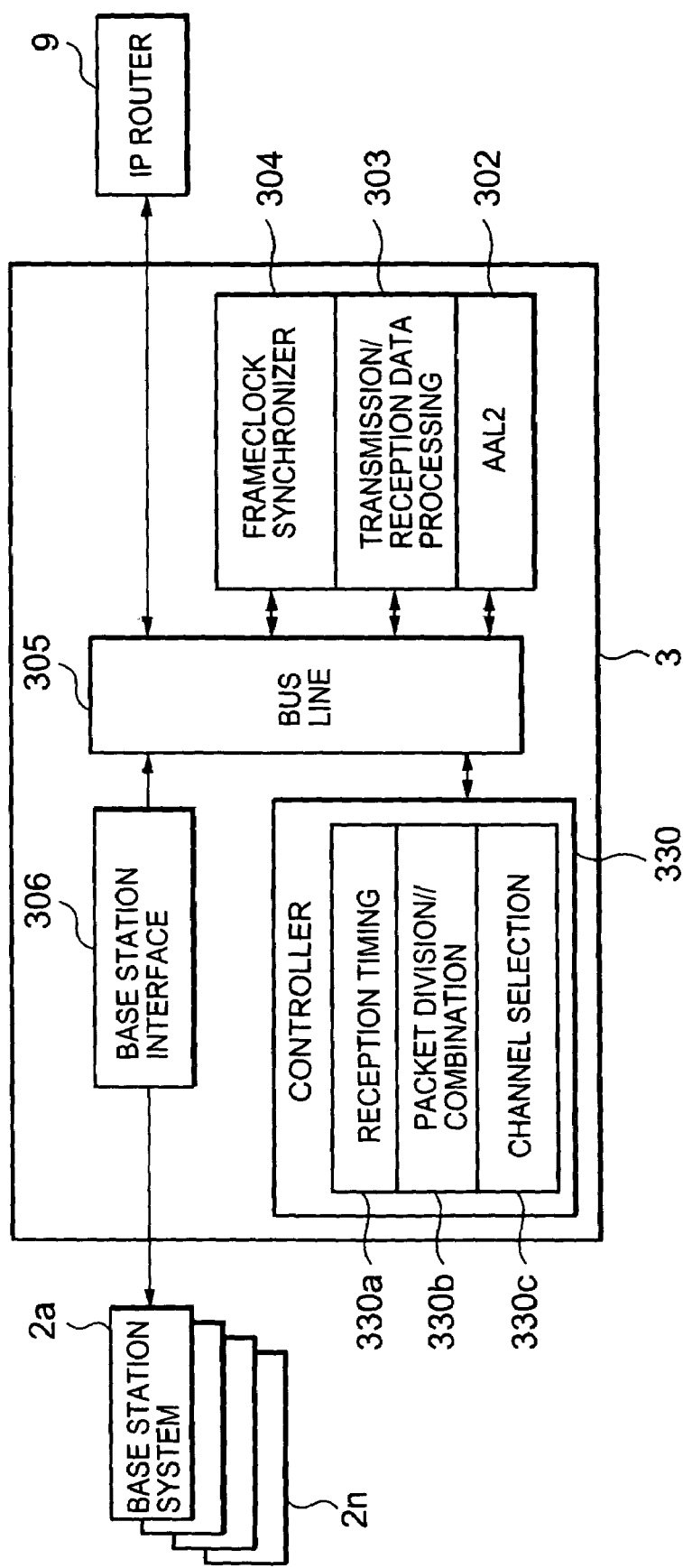
FIG. 23 is a view illustrating a system configuration of a base-station control system according to Embodiment 4.

In addition, FIG. 23 is a system configuration of the base station controller 3. As a new function, the controller 330 includes a payload-transmission-timing setting means 330a, a packet division/combination means 330b and a channel selection means 330c.

Moreover, the channel structure between respective layers is the same as that illustrated in FIG. 18 according to Embodiment 3. It would be understood that the channel structure is not limited to that discussed in Embodiment 3.

When voice data are transmitted from the telephone set 8 to the mobile terminal 1, the processing until the base station controller 3 is the same as that discussed in Embodiment 3.

In the base station controller 3, when the transmission channel with the mobile terminal 1 is connected, payloadreception-timing information 83b is formed by the payload-transmission-timing setting means 330a as a characteristic of Embodiment 4, and is transmitted by way of the base station system 2 to the mobile terminal 1.

The mobile terminal 1, which has received the payload-reception-timing information 83b, recognize from the quality of transport channels the type difference between headers and payloads, and from reception timing relative to the header the order of the payloads.

Figure 24:
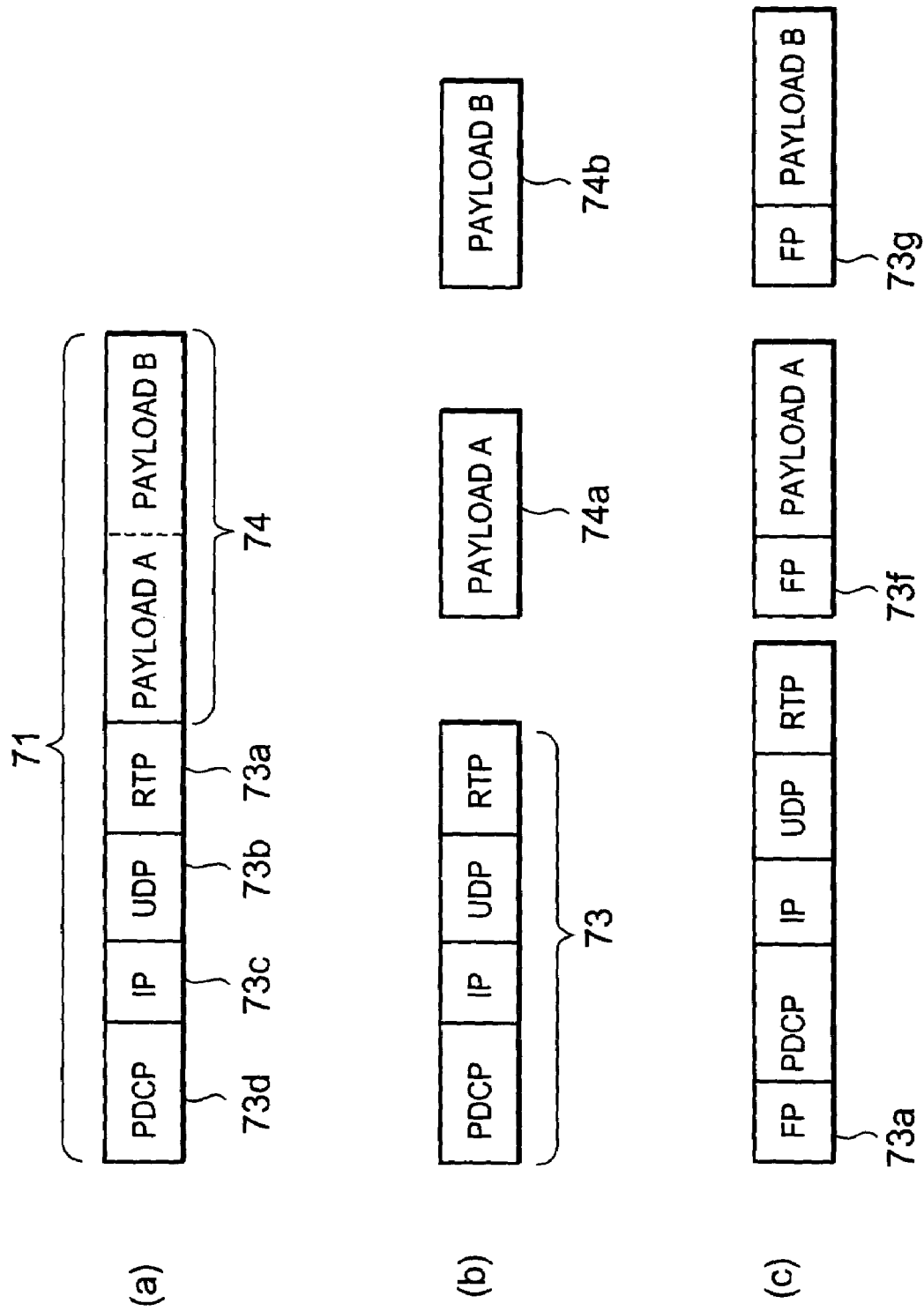
FIG. 24 is a view illustrating frame structures of packets according to Embodiment 4.

When the channel connection is implemented, and an actual call is initiated, the packet in the RLC layer 102b of the base station controller 3 has a packet configuration illustrated in FIG. 24(a). At 71 is a packet; at 73a, a RTP header; at 73b, a UDP header; at 73c, an IP header; at 73d, a PDCP header; and at 74 are payloads. Because, as discussed in Embodiment 3, the retransmission control is not executed in the present invention, the RLC header is not added.

The packet 71 is divided in the MAC layer 101b, as illustrated FIG. 24(b), and the packet segments thereof are distributed to the respective transport channels 26d and 26e to be conveyed to the FP layer 110b.

In the FP layer 110b, as illustrated in FIG. 24(c), the respective packet segments with the FP headers 73e, 73f and 73g, which include the transmission timing to be transmitted from the base station system 2, being added are conveyed by way of the AAL2 layer 109b to the base station system 2.

In these FP headers 73e, 73f and 73g, the reception timing of the payloads 74a and 74b is indicated, which is in synchronization with that indicated by the foregoing payload-reception-timing information 83b, with respect to the reception timing of the header 73.

In the base station system 2, respective packet segments having configurations illustrated in FIG. 24(c) are conveyed by way of the AAL2 layer 109a of the base station system 2 to the FP layer 110a. In the FP layer 110a, with the respective FP headers 73e, 73f and 73g being checked and eliminated, the packet segments are transmitted in the respective transmission timing to the mobile terminal 1. The header 73, through the transport channel 26d whose required quality is high, and the packet segments of the payloads 74a and 74b, through the transport channel 26e whose required quality is low, are transmitted.

Figure 25:
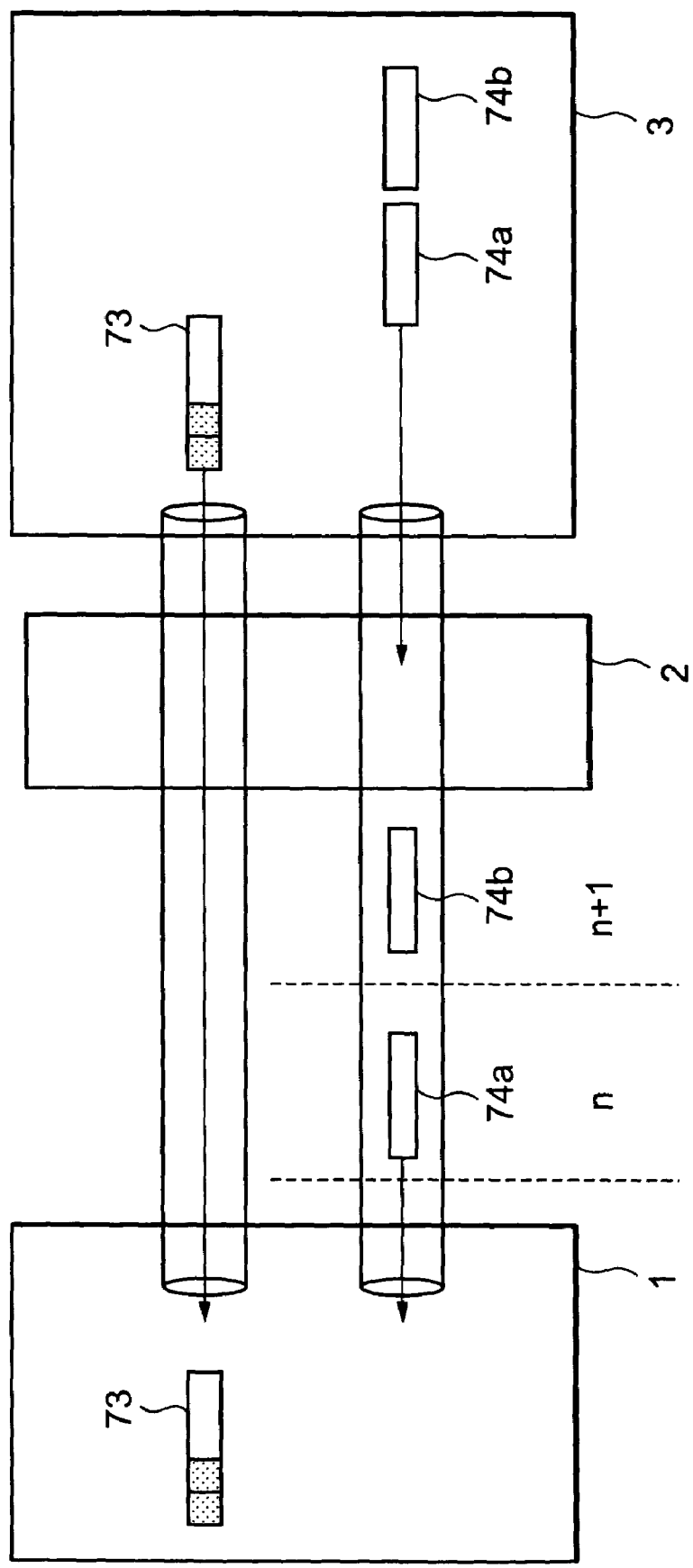
FIG. 25 is a view illustrating transmission timing of each packet segment according to Embodiment 4.
Figure 26:
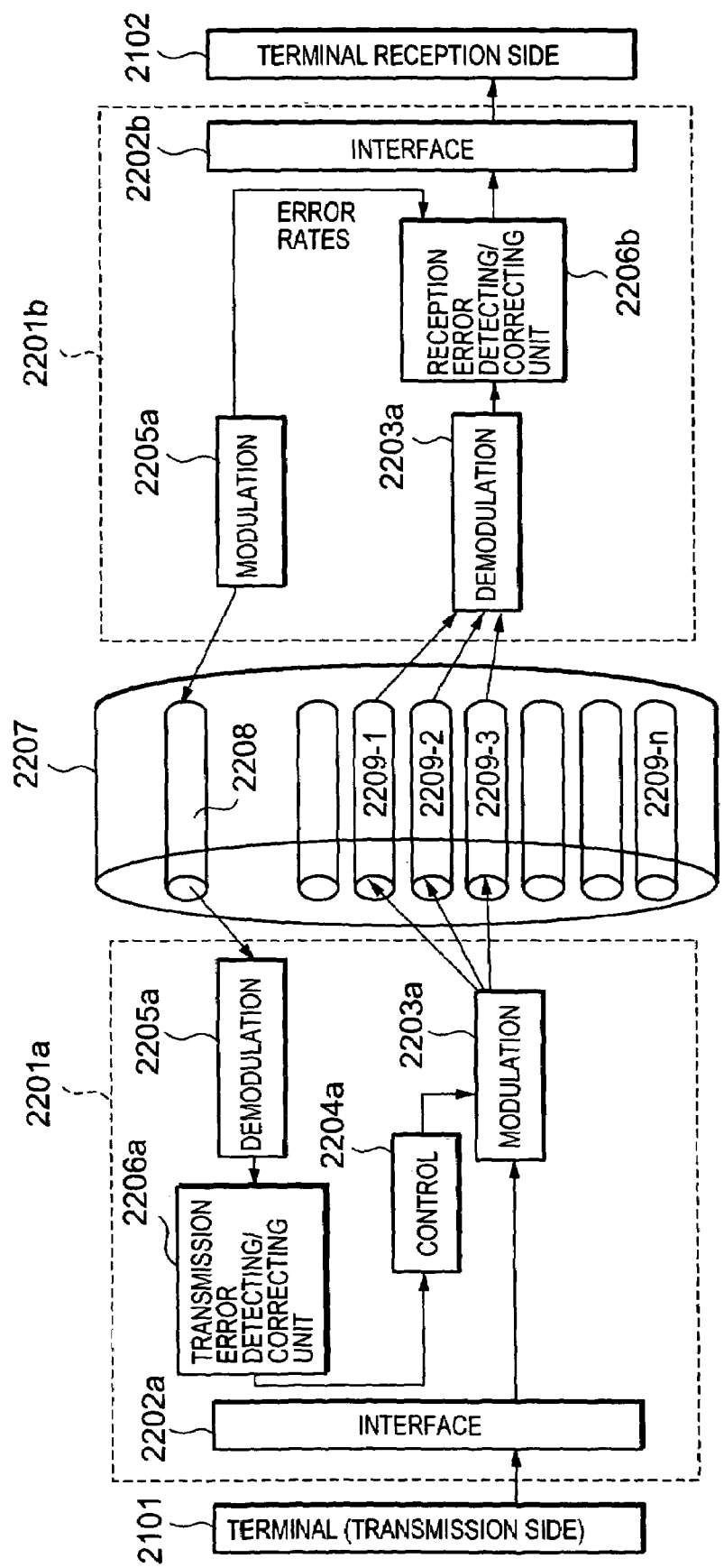
FIG. 26 is a view illustrating a configuration of a conventional mobile communication system.

FIG. 25 illustrates a method for transmitting each packet segment. FIG. 25 indicates the cases where, with respect to the header 73, the payload 74a has relative frame timing of 0; the payload 74b has the relative frame timing of +1.

In the mobile terminal 1, the respective packet segments are conveyed by way of the physical layer 100a to the MAC layer 101a. Configurations of the respective packet segments in this situation, are illustrated in FIG. 24(b). The respective packet segments themselves do not include any identification information that indicates that they are formed through dividing a single packet; however, the order of the received payloads 74a and 74b are recognized both from the information, which has been preliminarily reported from the base station controller 3 to the mobile terminal, that, through which transport channels, the respective headers and payloads are transferred, and from the reception timing indicated by the foregoing payload-reception-timing information 83b; and the respective packet segments are re-synthesized in the MAC layer 101a into a single packet as illustrated in FIG. 24(a) and then conveyed to the upper layers.

In the upper layers, voices are reproduced by means of the same processing as that of Embodiment 3 discussed above.

As discussed above, because the identification information for the re-synthesis does not need to be added to each packet segment itself if the reception timing is preliminarily reported, an efficient mobile communication system is obtained.

In contrast, in cases where the transmission is implemented from the mobile terminal 1, channel-connection-control information 81 as well as payload-reception-timing information 83a formed by the payload-transmission-timing setting means 250a in the control CPU 250 illustrated in FIG. 22 instruct, by way of the CDMA signal processor 206, the transmission circuitry 205 and the like, the base station controller 3 on the relative reception timing of the payloads; and then the respective packet segments are transmitted.

The packet configurations in the RLC layer 102a and the MAC layer 101a of the mobile terminal 1 are the same as those illustrated in FIGS. 24(a) and (b). Because the FP layer 110 does not exist in the mobile terminal 1, the packet segments are transmitted to the base station system 2 with the packet configurations illustrated in FIG. 24(b) instead of the packet configurations illustrated in FIG. 24(c).

In the FP layer 110a of the base station system 2, the respective packet segments with the timing received by the base station system 2 being recorded in the FP headers 73e, 73f, and 73g are transmitted by way of the AAL2 layer 109a to the base station controller 3.

In the FP layer 10b of the base station controller 3, the reception timing recorded in the FP headers 73e, 73f, and 73g is compared with the reception timing information that has been preliminarily reported by means of the payload-reception-timing information 83a when the channel connection has been initiated; the header 73, the identification of the payloads 74a and 74b and notification to the MAC layer 101b are implemented; and in the MAC layer 101b, the respective packet segments as illustrated in FIG. 24(b) are conveyed to upper layers after being re-synthesized into a single packet as illustrated in FIG. 24(a).

Processing that follows thereafter is implemented in the same manner as that discussed in Embodiment 3, and then voices are reproduced in the telephone set 8.

As discussed above, according to Embodiment 4, in cases where the payloads 74a and 74b have a fixed length, the addition of the reception-timing information upon transmission of each packet is unnecessary, if the reception timing of the packet for the mobile terminal 1 is preliminarily set in the base station controller 3. As a result, once the setting is implemented, because the segmented headers and payloads can be re-synthesized into a single packet without fault, a mobile communication system with raised reliability is obtained.

INDUSTRIAL APPLICABILITY

As discussed above, mobile communication systems according to the present invention can effectively utilize wireless resources, by classifying a plurality of transport channels according to quality and by transmitting packets including important data through the transport channels having high quality and the rest of packets, through the transport channels having low quality; therefore, mobile communication systems with high reliability are obtained.

What is claimed is:

1. A packet transmission method for a wireless telecommunication system including a base station and mobile stations, comprising:

a first allocation step of allocating to RTP (real-time transport protocol) data packets generated from data to be transmitted, a first logical channel out of a plurality of logical channels provided between a MAC (medium access control) layer and an RLC (radio link control) layer as an upper layer thereof, and a first transport channel out of a plurality of transport channels provided between a physical layer and the MAC layer as an upper layer thereof;

a second allocation step of allocating to RTCP (real-time transport control protocol) data packets generated from data to be transmitted,
a second logical channel different from the first logical channel, out of the plurality of logical channels, and
a second transport channel having a bit error rate differing from that of the first transport channel, out of the plurality of transport channels; and a transmission step of transmitting,
the RTP data to which the first logical channel and the first transport channel are allocated through the first allocation step, and
the RTCP data to which the second logical channel and the second transport channel are allocated through the second allocation step.

2. A packet transmission device for a wireless telecommunication system including a base station and mobile stations, comprising:
a first allocation unit configured to allocate to RTP (real-time transport protocol) data packets generated from data to be transmitted,
a first logical channel, out of a plurality of logical channels provided between a MAC (medium access control) layer and an RLC (radio link control) layer as an upper layer thereof, and
a first transport channel out of a plurality of transport channels provided between a physical layer and the MAC layer as an upper layer thereof,
a second allocation unit configured to allocate to the RTCP (real-time transport control protocol) data packets generated from data to be transmitted,
a second logical channel different from the first logical channel, out of the plurality of logical channels, and
a second transport channel having a bit error rate differing from that of the first transport channel, out of the plurality of transport channels; and a transmission unit configured to transmit,
the RTP data to which the first logical channel and the first transport channel are allocated by the first allocation unit, and
the RTCP data to which the second logical channel and the second transport channel are allocated by the second allocation unit.

3. The packet transmission method of claim 1, wherein the transmission step includes multiplex-transmitting the RTP data and the RTCP data to a physical channel.

4. The packet transmission device according to claim 2, wherein the transmission unit multiplex-transmits the RTP data and the RTCP data to a physical channel.

5. A packet transmission method for a wireless telecommunication system including a base station and mobile stations, comprising:
a first allocation step of allocating to RTP (real-time transport protocol) data packets generated from data to be transmitted,
a first logical channel out of a plurality of logical channels provided between a MAC (medium access control) layer and an RLC (radio link control) layer as an upper layer thereof, and
a first transport channel out of a plurality of transport channels provided between a physical layer and the MAC layer as an upper layer thereof;
a second allocation step of allocating to RTCP (real-time transport control protocol) data packets generated from data to be transmitted,
a second logical channel different from the first logical channel, out of the plurality of logical channels, and
a second transport channel having a bit error rate differing from that of the first transport channel, out of the plurality of transport channels;
a multiplex step of multiplexing in accordance with the bit error rates of the first transport channel and the second transport channel,
the RTP data block to which the first logical channel and the first transport channel are allocated at the first allocation step, and
the RTCP data block to which the second logical channel and the second transport channel are allocated at the second allocation step; and
a transmission step of transmitting the RTP data block and the RTCP data block multiplied at the multiplex step.

6. A packet transmission device for a wireless telecommunication system including a base station and mobile stations, comprising:
a first allocation unit configured to allocate to RTP (real-time transport protocol) data packets generated from data to be transmitted,
a first logical channel, out of a plurality of logical channels provided between a MAC (medium access control) layer and an RLC (radio link control) layer as an upper layer thereof, and
a first transport channel out of a plurality of transport channels provided between a physical layer and the MAC layer as an upper layer thereof;
a second allocation unit configured to allocate to the RTCP (real-time transport control protocol) data packets generated from data to be transmitted,
a second logical channel different from the first logical channel, out of the plurality of logical channels, and
a second transport channel having a bit error rate differing from that of the first transport channel, out of the plurality of transport channels;
a multiplex unit configured to multiplex in accordance with the bit error rates of the first transport channel and the second transport channel,
the RTP data block to which the first logical channel and the first transport channel are allocated by the first allocation unit, and
the RTCP data block to which the second logical channel and the second transport channel are allocated by the second allocation unit; and
a transmission unit configured to transmit the RTP data block and the RTCP data block multiplied by the multiplex unit.

7. The packet transmission method of claim 5, wherein the RTP data block and the RTCP data block are transmitted on a physical channel in the transmission step.

8. The packet transmission device of claim 6, wherein the RTP data block and the RTCP data block are transmitted on a physical channel by the transmission unit.

9. The packet transmission method of claim 1, wherein the second transport channel has the bit error rate lower than that of the first transport channel.

10. The packet transmission device of claim 2, wherein the second transport channel has the bit error rate lower than that of the first transport channel.

11. The packet transmission method of claim 5, wherein the second transport channel has the bit error rate lower than that of the first transport channel.

12. The packet transmission device of claim 6, wherein the second transport channel has the bit error rate lower than that of the first transport channel.

* * * * *